United States Patent
Wu et al.

(10) Patent No.: US 12,260,541 B2
(45) Date of Patent: Mar. 25, 2025

(54) SOLDERING QUALITY INSPECTION METHOD AND SOLDERING QUALITY INSPECTION APPARATUS

(71) Applicant: Materials Analysis Technology Inc., Hsinchu County (TW)

(72) Inventors: Shang-En Wu, Tainan (TW); Keng-Chi Liang, Kaohsiung (TW); Kuang-Tse Ho, Hsinchu County (TW); Hung-Jen Chen, Hsinchu (TW)

(73) Assignee: MATERIALS ANALYSIS TECHNOLOGY INC., Hsinchu County (TW)

( * ) Notice: Subject to any disclaimer, the term of this patent is extended or adjusted under 35 U.S.C. 154(b) by 448 days.

(21) Appl. No.: 17/853,859

(22) Filed: Jun. 29, 2022

(65) Prior Publication Data
US 2023/0029432 A1 Jan. 26, 2023

(30) Foreign Application Priority Data

Jul. 21, 2021 (TW) ................................ 110126717

(51) Int. Cl.
*G06T 7/00* (2017.01)
*G06T 7/11* (2017.01)

(52) U.S. Cl.
CPC .............. *G06T 7/0008* (2013.01); *G06T 7/11* (2017.01); *G06T 2207/30152* (2013.01)

(58) Field of Classification Search
CPC .................... G06T 7/0008; G06T 7/11; G06T 2207/30152
(Continued)

(56) References Cited

U.S. PATENT DOCUMENTS 5,621,811 A * 4/1997 Roder ................. G01R 31/304
348/126
5,651,493 A 7/1997 Bielick et al.
(Continued)

FOREIGN PATENT DOCUMENTS

CN 108956653 A 12/2018
CN 108152298 B * 11/2020 ............. G01N 21/91
(Continued)

OTHER PUBLICATIONS

A. A. R. M. A. Ebayyeh and A. Mousavi, A Review and Analysis of Automatic Optical Inspection and Quality Monitoring Methods in Electronics Industry, in IEEE Access, vol. 8, pp. 183192-183271, 2020, doi: 10.1109/ACCESS.2020.3029127. (Year: 2020).*

*Primary Examiner* — Henok Shiferaw
*Assistant Examiner* — Anh H Vuong
(74) *Attorney, Agent, or Firm* — Li & Cai Intellectual Property Office

(57) ABSTRACT

A soldering quality inspection method and a soldering quality inspection apparatus are provided. The soldering quality inspection method includes: acquiring an inspection image; calculating, by a processing device, a dyed area percentage of an area of a part of a soldering region in the inspection image that is dyed by a dye ink relative to an area of the soldering region, and determining whether the dyed area percentage is greater than a predetermined dyed percentage. When the dyed area percentage is determined to be equal to or less than the predetermined dyed percentage, a position under inspection is determined to be of good soldering quality, and a corresponding inspection result information is generated. When the dyed area percentage is determined to be greater than the predetermined dyed percentage, the position under inspection is determined to be of
(Continued)

poor soldering quality, and the corresponding inspection result information is generated.

18 Claims, 16 Drawing Sheets

(58) Field of Classification Search
USPC .......................................................... 382/150
See application file for complete search history.

(56) References Cited

U.S. PATENT DOCUMENTS

| | | | |
|---|---|---|---|
| 6,342,400 B1 | 1/2002 | DePetrillo | |
| 6,975,391 B1 | 12/2005 | Asano et al. | |
| 7,072,503 B2 * | 7/2006 | Prince | H05K 3/3485 |
| | | | 382/150 |
| 8,902,418 B2 * | 12/2014 | Jeong | G01N 21/956 |
| | | | 356/402 |
| 2005/0018898 A1 * | 1/2005 | White | G01N 21/91 |
| | | | 382/145 |

FOREIGN PATENT DOCUMENTS

| | | | | |
|---|---|---|---|---|
| JP | 11108759 | A | 4/1999 | |
| JP | 2005351910 | A | 12/2005 | |
| JP | 4892602 | B2 * | 3/2012 | ............. G01N 21/00 |
| JP | 6256249 | B2 * | 1/2018 | ....... G01N 21/95684 |
| JP | 2018179621 | A | 11/2018 | |
| JP | 2019141862 | A | 8/2019 | |
| TW | 201721134 | A | 6/2017 | |
| TW | 202126420 | A | 7/2021 | |
| WO | WO0060344 | A1 | 10/2000 | |

* cited by examiner

SOLDERING QUALITY INSPECTION METHOD AND SOLDERING QUALITY INSPECTION APPARATUS

CROSS-REFERENCE TO RELATED PATENT APPLICATION

This application claims the benefit of priority to Taiwan Patent Application No. 110126717, filed on Jul. 21, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a soldering quality inspection method and a soldering quality inspection apparatus, and more particularly to a soldering quality inspection method and a soldering quality inspection apparatus for inspecting a soldering quality of a substrate that is soldered through a surface-mount technology (SMT).

BACKGROUND OF THE DISCLOSURE

A red dye penetration test is a common process for inspecting a soldering quality of a circuit board, and mainly includes steps as follows. Firstly, a relevant personnel immerses a circuit board under inspection in a red dye. After the circuit board is taken out and dried, electronic components (e.g., integrated circuits) are removed. The relevant personnel then manually arranges the circuit board under a microscope that is configured with an appropriate magnification ratio, and observes statuses of soldering regions on the circuit boards by the naked eye. A soldering quality of the soldering region is determined by the relevant personnel based on experience.

In the abovementioned inspection process, the observation is performed manually by the naked eye, and soldering quality is subjectively determined by the relevant personnel. As such, misjudgments often occur. Furthermore, manual observation is time-consuming and not cost-effective. When the observation and determination are performed manually by the naked eye, completely different determination results on the soldering quality of the same circuit board may be produced by different personnel.

SUMMARY OF THE DISCLOSURE

In response to the above-referenced technical inadequacies, the present disclosure provides a soldering quality inspection method and a soldering quality inspection apparatus, so as to address issues associated with conventionally observing a soldering quality of relevant soldering positions on a substrate by the naked eye (such as being time-consuming and labor-intensive, and having poor inspection quality).

In one aspect, the present disclosure provides a soldering quality inspection method for inspecting a soldering quality of a position under inspection of an assembly under inspection. The assembly under inspection is formed by an electronic assembly being immersed in a dye ink, drying the electronic assembly, and removing an electronic element of the electronic assembly. The electronic assembly includes a substrate and the electronic element, the substrate has at least one soldering pad disposed thereon, the least one soldering pad is connected with the electronic element through a soldering structure, and a position on the substrate for placement of the at least one soldering pad is defined as the position under inspection. The soldering quality inspection method includes an image acquisition step and a percentage calculating and quality determining step. The image acquisition step is for acquiring an inspection image that includes at least one soldering region, in which the at least one soldering region is an image that corresponds to the position under inspection. The percentage calculating and quality determining step is for calculating, by a processing device, a dyed area percentage of an area of a part of the at least one soldering region that is dyed by the dye ink relative to an area of the at least one soldering region, and determining, by the processing device, whether or not the dyed area percentage is greater than a predetermined dyed percentage. When the processing device determines that the dyed area percentage is equal to or less than the predetermined dyed percentage, the processing device determines that the position under inspection is of good soldering quality and generates a corresponding inspection result information. When the processing device determines that the dyed area percentage is greater than the predetermined dyed percentage, the processing device determines that the position under inspection is of poor soldering quality and generates the corresponding inspection result information.

In another aspect, the present disclosure provides a soldering quality inspection apparatus that includes a carrier, a processing device, an image capturing device and an outputting device. The carrier is used to carry a substrate, and the image capturing device and the outputting device are each electrically connected with the processing device. The processing device is used to perform a soldering quality inspection method for inspecting a soldering quality of a position under inspection of an assembly under inspection. The assembly under inspection is formed by an electronic assembly being immersed in a dye ink, drying the electronic assembly, and removing an electronic element of the electronic assembly. The electronic assembly includes the substrate and the electronic element, the substrate has at least one soldering pad disposed thereon, the at least one soldering pad is connected with the electronic element through a soldering structure, and a position on the substrate for placement of the at least one soldering pad is defined as the position under inspection. The soldering quality inspection method includes an image acquisition step and a percentage calculating and quality determining step. The image acquisition step is for controlling the image capturing device to perform image capturing on the position under inspection of the assembly under inspection that is disposed on the carrier, so as to acquire an inspection image that includes at least one soldering region, in which the at least one soldering region is an image that corresponds to the position under inspection. The percentage calculating and quality determining step is for calculating a dyed area percentage of an area of a part of the at least one soldering region that is dyed by the dye ink relative to an area of the at least one soldering region, and determining whether or not the dyed area percentage is greater than a predetermined dyed percentage. When the dyed area percentage is determined to be equal to or less than the predetermined dyed percentage, the position under inspection is determined to be of good soldering quality, and a corresponding inspection result information is generated and transmitted to the outputting device. When the dyed area percentage is determined to be greater than the predetermined dyed percentage, the position under inspection is determined to be of poor soldering quality, and the corresponding inspection result information is generated and transmitted to the outputting device.

In summary, in the soldering quality inspection method and the soldering quality inspection apparatus provided by the present disclosure, the soldering quality of the position under inspection of the substrate can be rapidly and correctly determined, and no subjective assessment from relevant personnel is involved during a determination process. Therefore, the issue in the conventional technology where different personnel have completely different determination results after observation of the same substrate does not occur.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
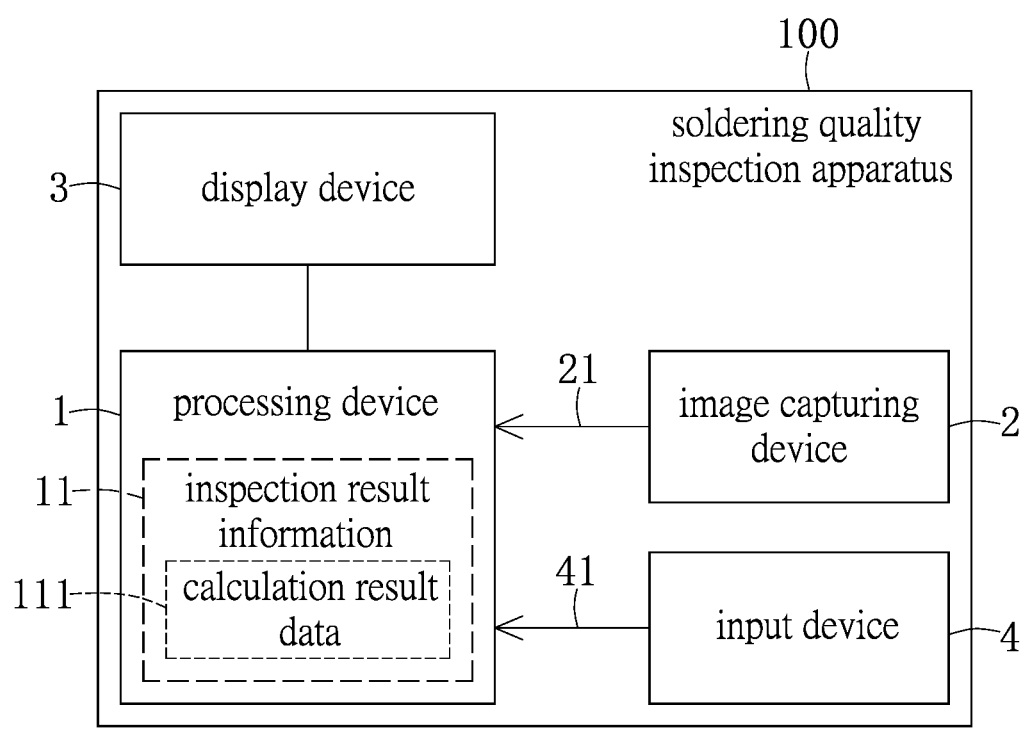
FIG. 1 is a schematic block diagram of a soldering quality inspection apparatus of the present disclosure.
Figure 2:
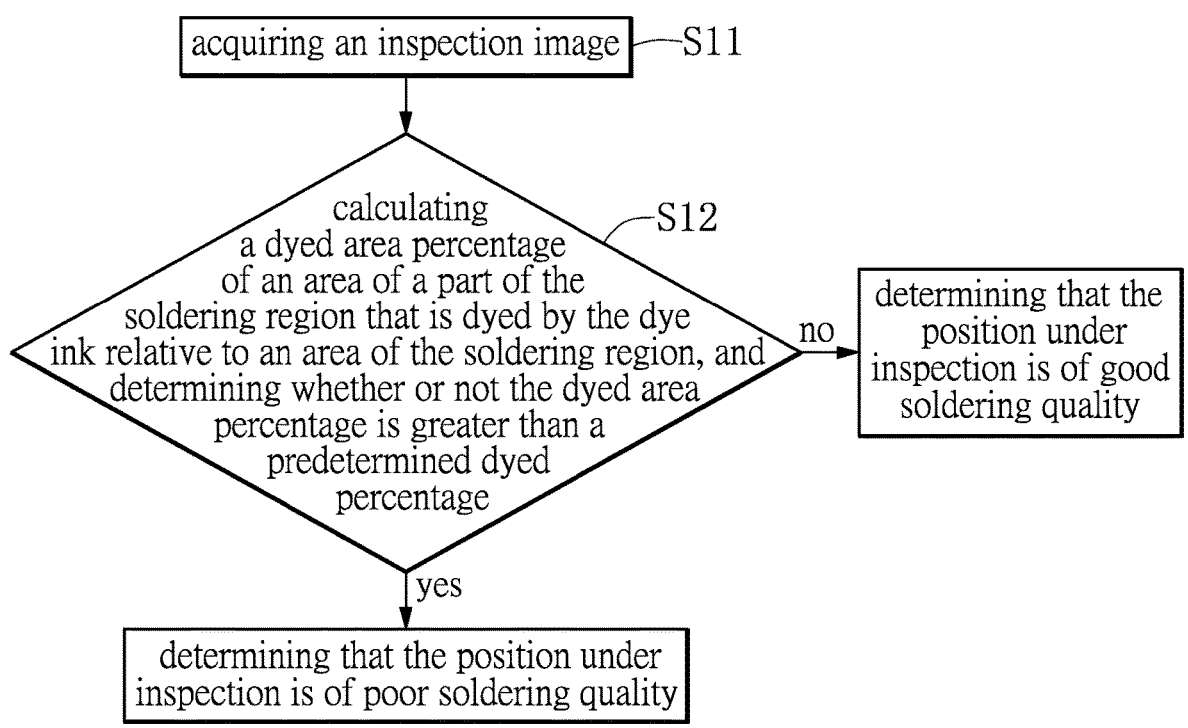
FIG. 2 is a flowchart of a soldering quality inspection method according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1 to FIG. 4. A soldering quality inspection apparatus 100 of the present disclosure is used to inspect a soldering quality of at least one position under inspection of an assembly under inspection, and a soldering quality inspection method of the present disclosure is used to inspect the soldering quality of the at least one position under inspection of the assembly under inspection. In practical applications, the soldering quality inspection method of the present disclosure can be executed by the soldering quality inspection apparatus 100 of the present disclosure, but is not limited thereto. The assembly under inspection is formed by an electronic assembly being immersed in a dye ink, drying the electronic assembly, and removing an electronic element of the electronic assembly. The electronic assembly includes a substrate and the electronic element, the substrate has at least one soldering pad (conventionally known as pad) disposed thereon and connected with the electronic element through a soldering structure, and a position for disposing the at least one soldering pad on the substrate is defined as the position under inspection.

In practical applications, the dye ink can be an ink of a red color, but is not limited thereto. A color of the dye ink can be determined according to a surface color of the substrate. Furthermore, the time for the substrate to be immersed in the dye ink and the drying time after immersion can be determined according to the material of the substrate, the type of the dye ink, the type of electronic elements, etc., and are not limited thereto. The substrate can be a variety of circuit boards. The soldering pad can be connected to traces on the substrate, or the soldering pad can be not connected to the traces on the substrate. The soldering structure can be, for example, made of solder balls, soldering paste, etc., but is not limited thereto. The electronic element can be any electronic component. For example, the electronic element can be an integrated circuit chip.

The soldering quality inspection apparatus 100 of the present disclosure includes a carrier (not shown in the figures), a processing device 1 and an image capturing device 2. The carrier is used to carry the assembly under inspection, the processing device 1 is electrically connected with the image capturing device 2, and the processing device 1 can control the image capturing device 2 to perform image capturing on the position under inspection of the assembly under inspection. The processing device 1 can execute the soldering quality inspection method of the present disclosure, so as to determine the soldering quality of the at least one position under inspection of the assembly under inspection that is disposed on the carrier. The carrier can be any mechanism that can be used to carry and fix the substrate thereto, and the processing device 1 can be any computer, cloud server, etc., that can perform image recognition and image calculation.

The soldering quality inspection method of the present disclosure includes steps as follows.

An image acquisition step S11: acquiring an inspection image 21 that includes at least one soldering region 21A, and the soldering region 21A is an image that corresponds to the position under inspection.

A percentage calculating and quality determining step S12: using the processing device 1 to calculate a dyed area percentage of an area of a part of the soldering region 21A that is dyed by the dye ink relative to an area of the soldering region 21A, and using the processing device 1 to determine whether or not the dyed area percentage is greater than a predetermined dyed percentage.

Figure 3:
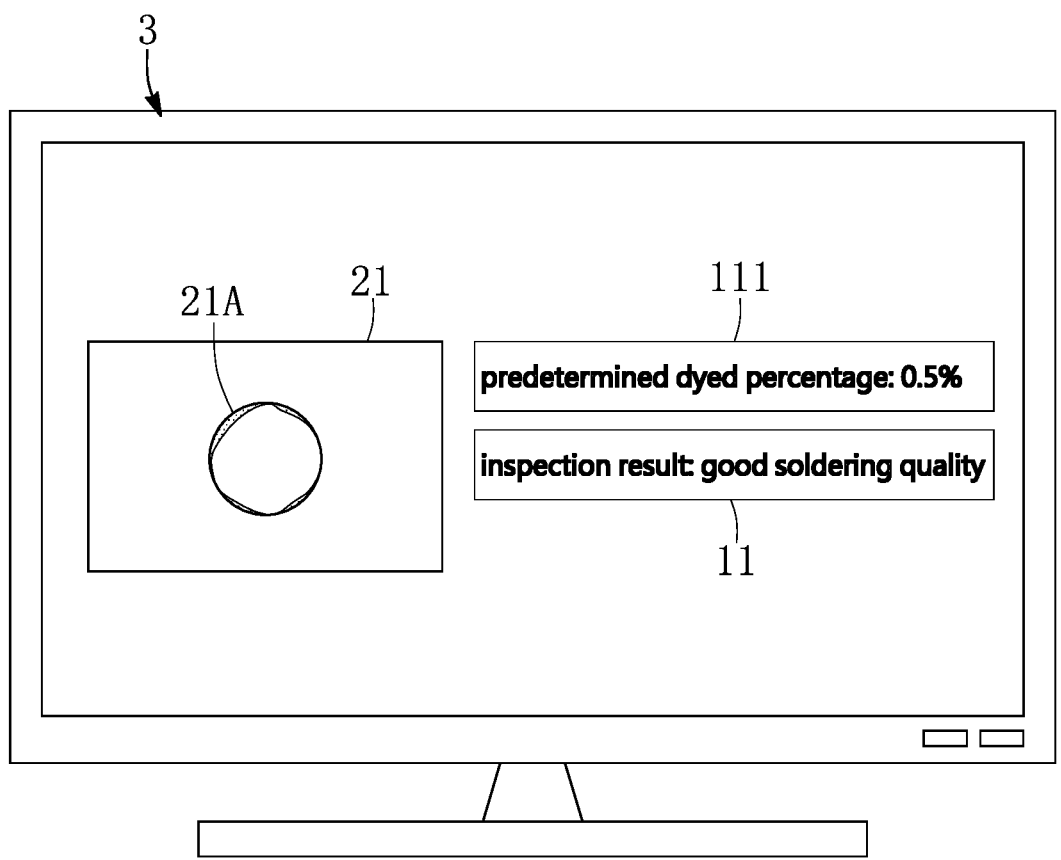
FIG. 3 and FIG. 4 respectively are schematic views showing inspection images determined to be of good soldering quality and poor soldering quality through the soldering quality inspection method being displayed on a display device according to the first embodiment of the present disclosure.

When the processing device 1 determines that the dyed area percentage is equal to or less than the predetermined dyed percentage, the processing device 1 determines that the position under inspection is of good soldering quality (as shown in FIG. 3) and generates a corresponding inspection result information 11.

Figure 4:
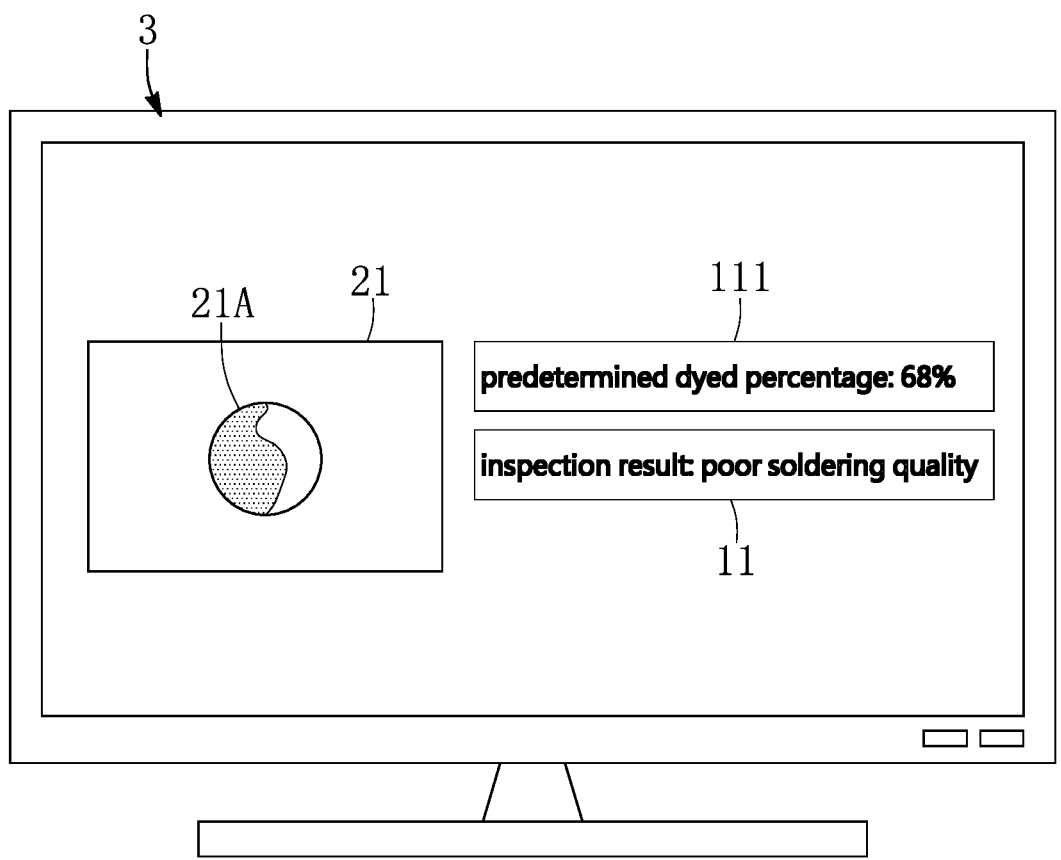
Figure 5:
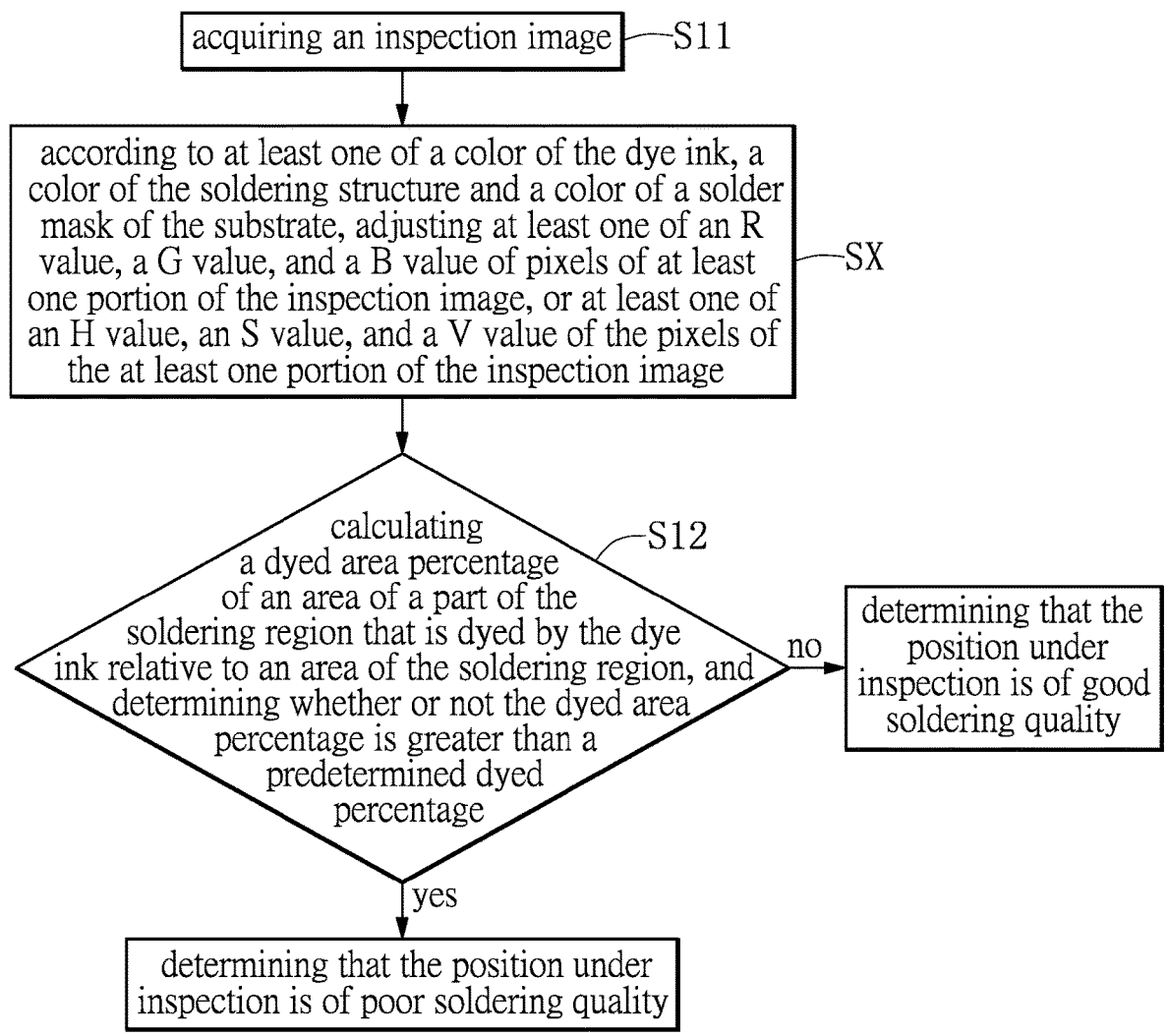
FIG. 5 is a flowchart of the soldering quality inspection method according to a second embodiment of the present disclosure.

When the processing device 1 determines that the dyed area percentage is greater than the predetermined dyed percentage, the processing device 1 determines that the position under inspection is of poor soldering quality (as shown in FIG. 4) and generates the corresponding inspection result information 11.

In practical applications, in the image acquisition step S11, the image capturing device 2 can be used to perform image capturing on one position under inspection of the assembly under inspection, so as to directly form the inspection image 21. Or, after the image capturing device 2 is used to capture a captured image containing multiple positons under inspection of the assembly under inspection, an image containing the one position under inspection can be separated from the captured image according to requirements, so as to serve as the inspection image 21.

In the percentage calculating and quality determining step S12, the processing device 1 can, for example, calculate an RGB value (or an HSV value) of each of pixels of the soldering region 21A, and compare a pre-stored RGB value corresponding to the dye ink with the RGB value (or the HSV value) of each of the pixels of the soldering region 21A, so as to determine which of the pixels are dyed. Finally, through calculating a number of the pixels that are dyed and a number of the pixels of the soldering region 21A, a dyed area percentage is calculated. For example, if the dye ink is of a red color, the processing device 1 can determine whether or not the R value, the G value, and the B value of each of the pixels of the soldering region 21A correspondingly fall within a predetermined range (for example, the R value is greater than 200, the G Value is less than 130, and the B value is less than 130). If the processing device 1 determines that the R value, the G value, and the B value of a current pixel respectively fall within the predetermined range, the processing device 1 can determine that the current pixel has been dyed red. Naturally, the processing device 1 can also convert the RGB value of each of the pixels into the HSV value, and then compare the HSV value with a pre-stored HSV value corresponding to the dye ink for determining whether or not the pixels of the soldering region 21A have been dyed. In practical applications, the image capturing device 2 can be used to capture an image of the dye ink under the same light source, so as to generate a captured image of the dye ink. Then, the processing device 1 is used to analyze the captured image of the dye ink, so as to obtain the predetermined range.

In one of the implementations, in order to increase a speed of the processing device 1 in performing the percentage calculating and quality determining step S12, the image capturing device 2 can be configured to include a filter in the image acquisition step S11, so that the image capturing device 2 can only receive light beams that correspond to the color of the dye ink. In one exemplary embodiment, the soldering quality inspection apparatus 100 can also include a display device 3 and at least one input device 4, and the processing device 1 is electrically connected with the display device 3 and the input device 4. The processing device 1 can control the display device 3 to display the inspection image 21, and the processing device 1 can control the display device 3 to display the inspection result information 11 after the percentage calculating and quality determining step S12. The inspection result information 11 can include the inspection image 21 and a calculation result data 111. In this way, relevant personnel can view the inspection image 21 and the calculation result data 111 at the same time through the inspection result information 11 displayed on the display device 3, and know a percentage of an area of the current inspection image 21 that is dyed. The calculation result data 111 is generated from the processing device 1 performing the percentage calculating and quality determining step S12. Furthermore, the relevant personnel can determine the predetermined dyed percentage by operating the input device 4 according to actual requirements. The input device 4 can include, for example, a mouse, a keyboard, a touch screen, and the like. In one of the implementations, the predetermined dyed percentage can be from 0% to 25%. In an embodiment where the predetermined dyed percentage is 0%, as long as the soldering region 21A is dyed, the processing device 1 determines that the soldering region 21A is of poor soldering quality in the percentage calculating and quality determining step S12.

As shown in FIG. 3, when the processing device 1 determines that the position under inspection is of good soldering quality, the relevant personnel can view the inspection image 21 (shadings as shown in the figure represent regions that are dyed) and a text string of "predetermined dyed percentage: 0.5%" (i.e., the calculation result data 111) in the inspection result information 11 displayed on the display device 3, and the relevant personnel can determine whether or not the processing device 1 has made an erroneous determination by viewing the inspection image 21 and the calculation result data 111. As shown in FIG. 4, when the processing device 1 determines that the position under inspection is of poor soldering quality, the relevant personnel can view the inspection image 21 (shadings as shown in the figure represent regions that are dyed) and a text string of "predetermined dyed percentage: 68%" (i.e., the calculation result data 111) in the inspection result information 11 displayed on the display device 3, and the relevant personnel can then determine a cause that causes the position under inspection to be of poor soldering quality by viewing the inspection image 21. Naturally, the relevant personnel can also determine whether or not the processing device 1 has made an erroneous determination by viewing the inspection image 21 and the calculation result data 111.

In practical applications, the processing device 1 can receive a modifying information 41 generated by the input device 4, and change the RGB value (or the HSV value) of the dye ink in the percentage calculating and quality determining step S12 according to the modifying information 41. In other words, according to the color of the dye ink that is currently used, the relevant personnel can operate the input device 4 to change the RGB value (that is, the RGB value of the dye ink) that the processing device 1 uses to compare and determine whether or not each of the pixels in the soldering region 21A is dyed in the percentage calculating and quality determining step S12.

In a practical implementation, after the processing device 1 performs the percentage calculating and quality determining step S12, the processing device 1 can transmit the inspection result information 11 and the inspection image 21 to the display device 3 or an external electronic device (such as a remote server, a smartphone, and a tablet computer), and the relevant personnel can know whether or not the current position under inspection is of good soldering quality by viewing the inspection result information 11 and the inspection image 21 displayed on the display device 3.

For determining whether or not a soldering quality is good, the above-mentioned soldering quality inspection method and soldering quality inspection apparatus of the present disclosure are more efficient and provide a stable determination quality as compared with a conventional observation performed manually by the naked eye and in cooperation with devices (such as a microscope). More specifically, a conventional process of inspecting the soldering quality of the position under inspection is as follows. The relevant personnel place the assembly under inspection under an electron microscope (or a microscope having an appropriate magnification ratio), and then the relevant personnel make the observation by the naked eye and subjectively determine whether or not the dye ink is present in the soldering region. Finally, the relevant personnel subjectively determine the soldering quality of the position under inspection. Such a process not only is time-consuming and labor-intensive, but is also highly dependent on the experience of the relevant personnel. Even when a same position under inspection is observed, different personnel may have completely different determination results. Therefore, this conventional inspection approach is unstable in its determination quality.

Reference is made to FIG. 1 to FIG. 5. One of the biggest differences between this embodiment and the aforementioned first embodiment lies in that the image acquisition step S11 and the percentage calculating and quality determining step S12 have an image processing step SX in between. According to at least one of the colors of the dye ink, the color of the soldering structure, and the color of a solder mask of the substrate, the processing device 1 is used to adjust at least one of the R value, the G value, and the B value of pixels of at least one portion of the inspection image 21, or to adjust at least one of an H value, an S value, and a V value of the pixels of the at least one portion of the inspection image 21. Therefore, when performing the percentage calculating and quality determining step S12, the processing device 1 can better determine the pixels that are dyed, so as to more accurately calculate the dyed area percentage and determine the soldering quality of the position under inspection.

For example, the processing device 1 can first use the R value, the G value, and the B value (or the H value, the S value, and the V value) of the solder mask as a reference to determine pixels having substantially the same R value, the G value, and the B value (or the H value, the S value, and the V value), and then adjust the RGB value (or the HSV value) of these pixels to a hue of a black color.

In another example, when the color of the dye ink is red, the processing device 1 can first use the actual R value, the G value, and the B value (or the H value, the S value, and the V value) of the dye ink as a reference to determine pixels that have substantially the same R value, the G value, and the B value (or the H value, the S value and the V value), and then increase and adjust the RGB value of these pixels to (255,0,0). That is, the processing device 1 first determines which of the pixels are dyed, and then directly adjusts the RGB values of these pixels to represent a red color.

For example, when the dye ink is of the red color, in the image processing step SX, the processing device 1 can first determine whether or not the R value, the G value, and the B value of each of the pixels satisfy the conditions of R>200, G<130, and B<130. If the processing device 1 determines that the RGB value of one of the pixels meets the above-mentioned conditions, the processing device 1 can modify the R value of the pixel to 255, and adjust the G value and B value of the pixel to one quarter of the original value.

In different applications, in the image processing step SX, the processing device 1 can also read each of the pixels one by one, and compare the RGB values (or the HSV values) of each of the pixels with those of an adjacent pixel. If a difference between the RGB value of a current pixel and the RGB value of the adjacent pixel is too large, the processing device 1 can directly modify the current pixel to a black color or a white color. In this way, after the image processing step SX, each of the pixels of the inspection image is in the black color or the white color. Therefore, in the percentage calculating and quality determining step S12, the processing device 1 can simply calculate the dyed area percentage by calculating an amount of pixels that are shown in the white (or black) color.

Figure 6:
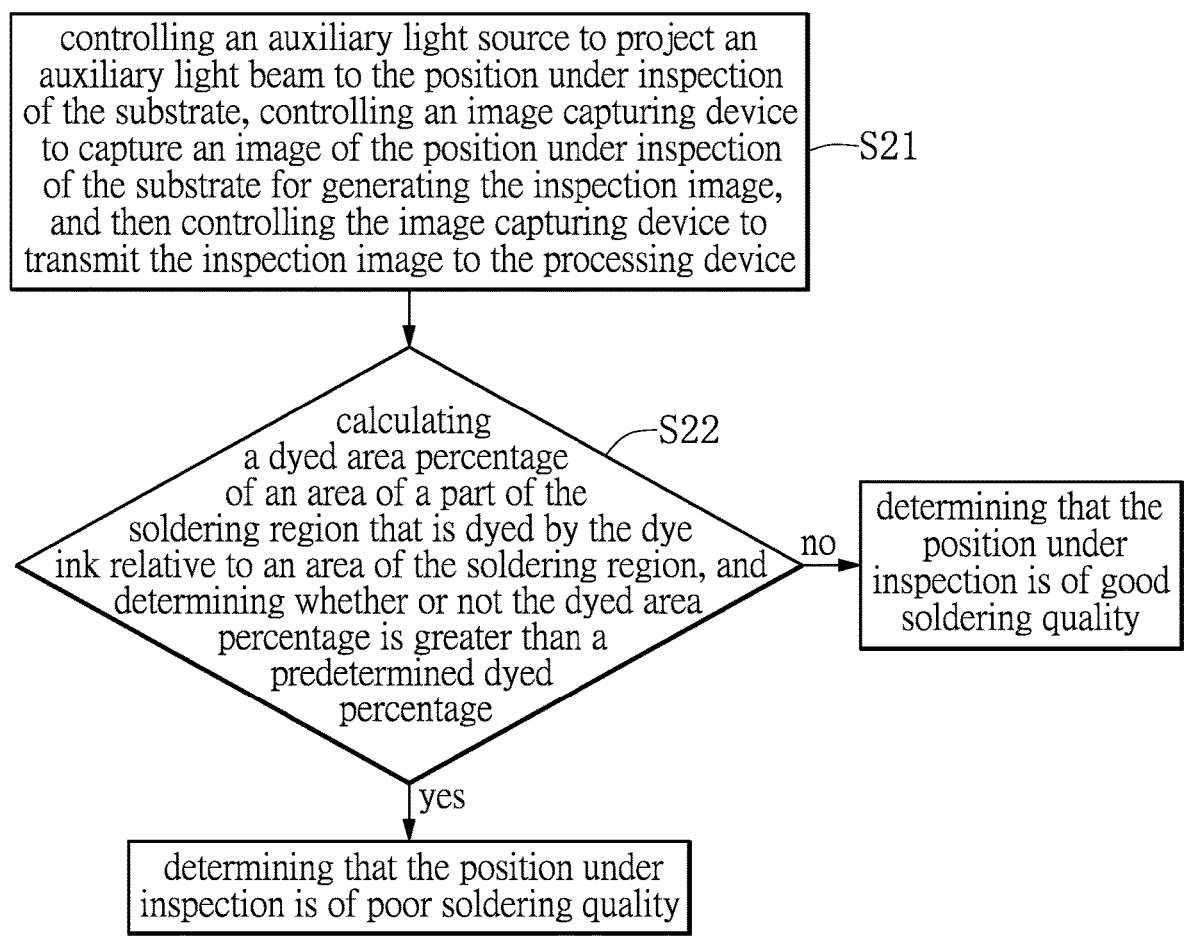
FIG. 6 is a flowchart of the soldering quality inspection method according to a third embodiment of the present disclosure.

Reference is made to FIG. 1, which is to be read in conjunction with FIG. 6. The soldering quality inspection method of this embodiment sequentially includes an image acquisition step S21 and a percentage calculating and quality determining step S22. The percentage calculating and quality determining step S22 is the same as the percentage calculating and quality determining step S12 of the first embodiment, and will not be repeated herein.

In the image acquisition step S21, firstly, at least one auxiliary light source is controlled to project an auxiliary light beam on at least one position under inspection of the substrate. Then, the image capturing device 2 is controlled to capture an image of the at least one position under inspection of the substrate for generating the inspection image 21. Afterwards, the image capturing device 2 is controlled to transmit the inspection image 21 to the processing device 1. The auxiliary light beam is mainly used to enhance edges of defects (such as bubbles, holes, and the regions that are dyed) of the soldering pads on the position under inspection, such that the regions that are dyed or a defect region in the inspection image 21 can be more clearly displayed. The processing device 1 can also better identify whether or not specific defects (such as air bubbles and holes) are present in the soldering region of the inspection image 21. In one of the specific embodiments, the auxiliary light source can be a ring light.

In one of the embodiments, the image capturing device 2 can be arranged directly above the substrate, the auxiliary light source can be arranged not to be directly above the substrate, and the auxiliary light beam emitted by the auxiliary light source is projected to each of the positions under inspection on the substrate along a lateral direction. In this way, presentation effects of various borders in the inspection image 21 is strengthened, and the various borders can be a border between the soldering region and the solder mask, borders of air bubbles (or holes, etc.) in the soldering region, etc. The auxiliary light source in this embodiment can be a white light, but is not limited thereto.

In one of the embodiments, a color of the auxiliary light beam emitted by the auxiliary light source and the color of the dye ink can be similar colors. For example, if the color of the dye ink is red, the auxiliary light source can emit a light beam having a wavelength between 620 nm and 750 nm. In this way, the red color displayed by the region that is dyed in the soldering region of the inspection image will be more noticeable.

In another embodiment, the color of the auxiliary light beam is decided based on a color of the dye ink and a subtractive color mixing manner, such that in the inspection image, pixels that correspond to positions of the substrate that are dyed by the dye ink have a grey color or a black color. For example, if the color of the dye ink is red, two auxiliary light sources can respectively emit light beams having colors close to yellow (i.e., having a wavelength from 570 nm to 590 nm) and close to cyan (i.e., having a wavelength from 476 nm to 495 nm), and project the light beams to the substrate at the same time. In this way, the pixels in the inspection image that correspond to the positions of the substrate that are dyed by the dye ink have a grey color or the black color.

In one different embodiment, a fluorescent agent can also be added to the dye ink, the assembly under inspection and the image capturing device are arranged in a dark room, and the auxiliary light source can emit and project an ultraviolet light to the assembly under inspection. In this way, in the captured image, regions that are not dyed are substantially represented in the black color, and the regions that are dyed are represented in a fluorescent color. Accordingly, in subsequent steps, the processing device can more rapidly determine the regions that are dyed in the inspection image.

In one of the embodiments, the soldering quality inspection equipment 100 can include at least two of the auxiliary light sources, and the two auxiliary light sources can respectively emit light beams of different wavelengths. In the image acquisition step S21, the processing device 1 can first control one of the two auxiliary light sources to project a first auxiliary light beam to the position under inspection, and the processing device 1 then controls the image capturing device 2 to capture the image of the position under inspection to form a first image. Subsequently, the processing device 1 can control another one of the two auxiliary light sources to project a second auxiliary light beam having a different wavelength to the same position under inspection, and the processing device 1 then controls the image capturing device 2 to capture the image of the position under inspection to form a second image. Finally, the processing device 1 can integrate the first image and the second image into the inspection image, so that objects to be analyzed in the soldering region (for example, the regions that are dyed, the soldering structure, and the solder mask) can be more clearly presented. Naturally, the processing device 1 can also first perform the aforementioned image processing step SX on the first image and the second image, and then integrate the first image and the second image into the inspection image.

In continuation of the above, if the solder mask is of a green color and the dye ink is of the red color, the processing device 1 can first control the one of the two auxiliary light sources to project a green light beam having a wavelength from 495 nm to 570 nm to the position under inspection, and then control the image capturing device 2 to capture an image of the position under inspection to generate the first image, so that the green color of the solder mask in the first image becomes more noticeable. The processing device 1 then controls the another one of the two auxiliary light sources to project a red-light beam having a wavelength from 620 nm to 750 nm to the same position under inspection, and the image capturing device 2 is controlled to capture an image of the position under inspection to generate the second image. In this way, the regions that are dyed in the second image become more noticeable. Finally, the processing device 1 can integrate the first image and the second image into the inspection image, such that the borders in the soldering regions become more clear and the region that are dyed are more clearly presented.

It should be noted that, the soldering quality inspection apparatus 100 of the present disclosure can also include at least one auxiliary light source to implement the soldering quality inspection method of this embodiment. Furthermore, in practical applications, the soldering quality inspection method mentioned in this embodiment can also be combined with the soldering quality inspection method mentioned in a second embodiment to become another embodiment.

Figure 7:
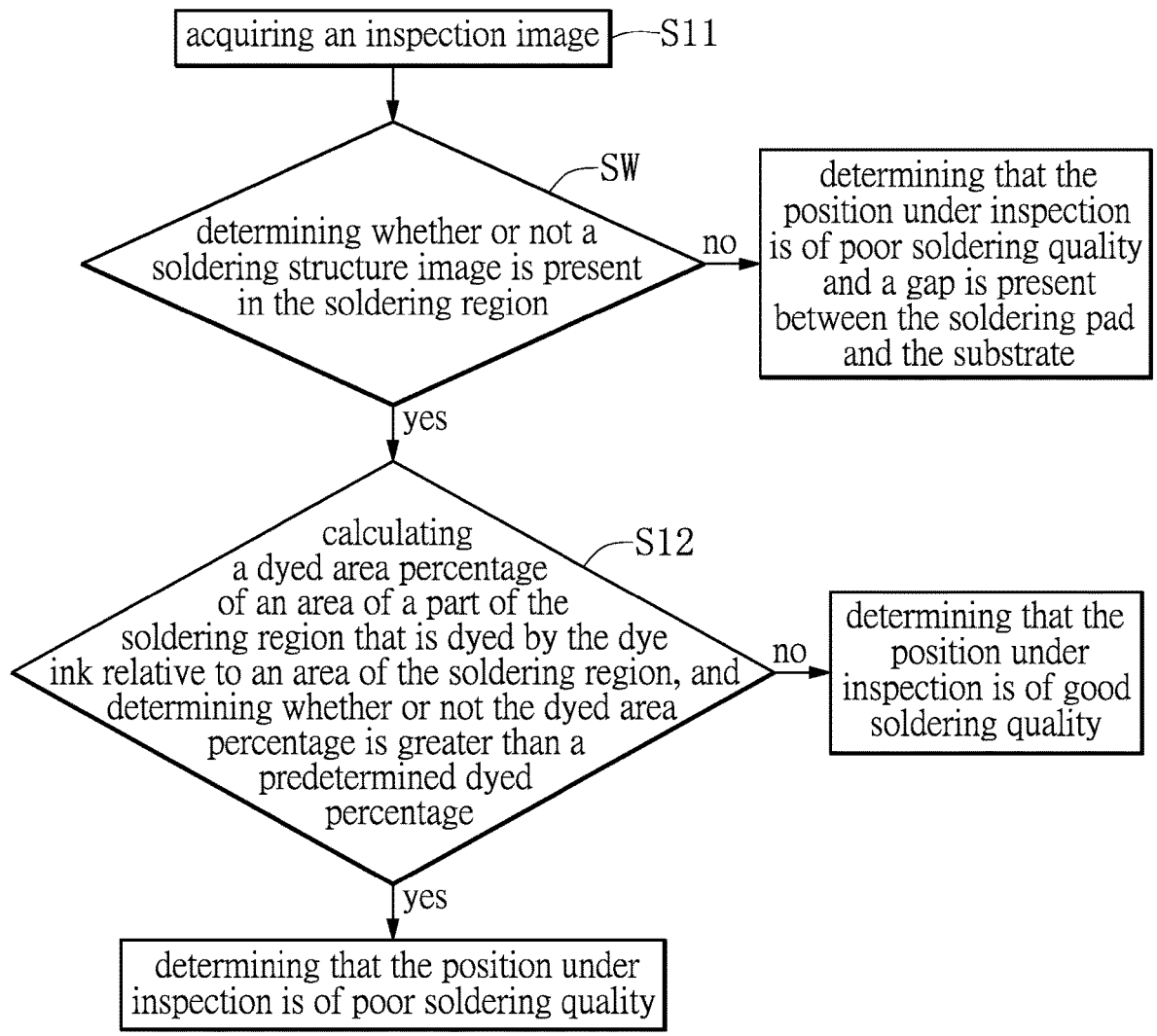
FIG. 7 and FIG. 8 respectively are a flowchart of the soldering quality inspection method according to a fourth embodiment of the present disclosure, and a schematic view showing an inspection image that is determined not to have a soldering structure in a soldering region as displayed on the display device according to the fourth embodiment of the present disclosure.
Figure 8:
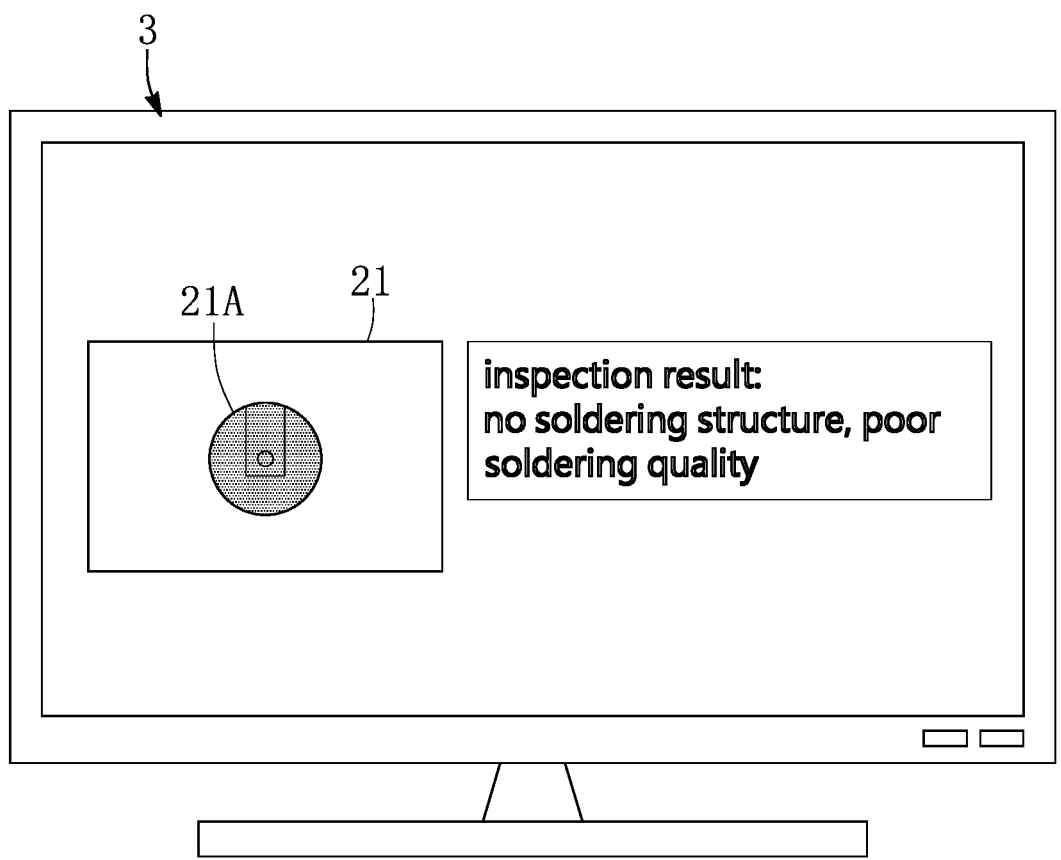

References are made to FIG. 1, which is to be read in conjunction with FIG. 7 and FIG. 8. The biggest difference between this embodiment and the aforementioned first embodiment lies in that the image acquisition step S11 and the percentage calculating and quality determining step S12 further have the following steps in between.

A soldering structure determining step SW: using the processing device 1 to determine whether or not a soldering structure image is present in the soldering region 21A in the inspection image 21, and the soldering structure image is an image that corresponds to the soldering structure on the substrate.

As show in FIG. 8, when the processing device 1 determines that the soldering structure image is not present in the soldering region 21A, the processing device 1 then determines that a gap is present between the soldering pad and the substrate and that the position under inspection is of poor soldering quality, and generates the corresponding inspection result information 11. The processing device 1 does not perform the percentage calculating and quality determining step S12. In practical applications, when the processing device 1 determines that the gap is present between the soldering pad and the substrate, the processing device 1 can further determine that the substrate of the assembly under inspection is of poor quality. For example, the relevant personnel can view the inspection result information 11 on the display device 3 and know that the substrate of the assembly under inspection may be of poor quality. In this way, the relevant personnel can proceed to investigate issues that may be present in the substrate (such as presence of foreign matters in the substrate, a poor pressing process, an insufficient amount of glue in the substrate, an uneven resin flow in the substrate, an uneven stacking of copper foil in the substrate, and a poor surface treatment of glass fiber). Conversely, if the processing device 1 determines that the soldering structure image is present in the soldering region 21A, the processing device 1 continues to perform the percentage calculating and quality determining step S12.

In one of the embodiments, in the soldering structure determining step SW, the processing device 1 can be used to determine whether or not the soldering region 21A matches with a pre-stored image. If the processing device 1 determines that the soldering region 21A matches with the pre-stored image, the processing device 1 then determines that no soldering structure is present at the position under inspection. If the processing device determines that the soldering region 21A does not match with the pre-stored image, the processing device 1 determines that the soldering structure is present at the position under inspection. In other words, an image of the soldering region 21A without the soldering structure (that is, the pre-stored image) can be pre-stored in the processing device 1. Then, in the soldering structure determining step SW, the processing device 1 can use various image comparison approaches to determine whether or not the inspection image 21 is the same as the pre-stored image.

It should be noted that, in practical applications, an image of the soldering region 21A with an incomplete soldering structure (that is, the pre-stored image) can also be pre-stored in the processing device 1. When the processing device 1 determines that the inspection image 21 matches with the pre-stored image, the processing device 1 determines that no soldering structure is present at the position under inspection. That is, when the substrate only has half of or less than half of a complete soldering structure, the processing device can determine that no soldering structure is present in the soldering region 21A.

In another specific embodiment, in the soldering structure determining step SW, the processing device 1 can be used to calculate an average brightness of all the pixels of the soldering region 21A, and determine whether or not the average brightness is lower than a preset soldering structure brightness. If the processing device 1 determines that the average brightness is lower than the preset soldering structure brightness, the processing device 1 determines that no soldering structure is present at the position under inspection. If the processing device 1 determines that the average brightness is higher than the preset soldering structure brightness, the processing device 1 determines that a soldering structure is present at the position under inspection. Specifically, if the position under inspection of the substrate does not have a soldering structure, the position under inspection is represented in the black color or substantially in the black color. Therefore, this approach can be used to rapidly determine whether or not a soldering structure is present in the soldering region 21A of the inspection image 21.

It should be noted that, the processing device 1 can adopt various approaches to determine whether or not a soldering structure is present in the soldering region 21A in the inspection image 21, and is not limited by the abovementioned two approaches. For example, in another embodiment, the processing device 1 may also use a relevant machine learning model to determine whether or not the soldering structure is present in the inspection image 21. Since appearances, materials, and sizes of the soldering structure may be different according to the requirements of different manufacturers, and the soldering structure may be connected with one, two, or more traces, the machine learning module can be used for a better and a more rapid determination of the inspection image 21.

Figure 9:
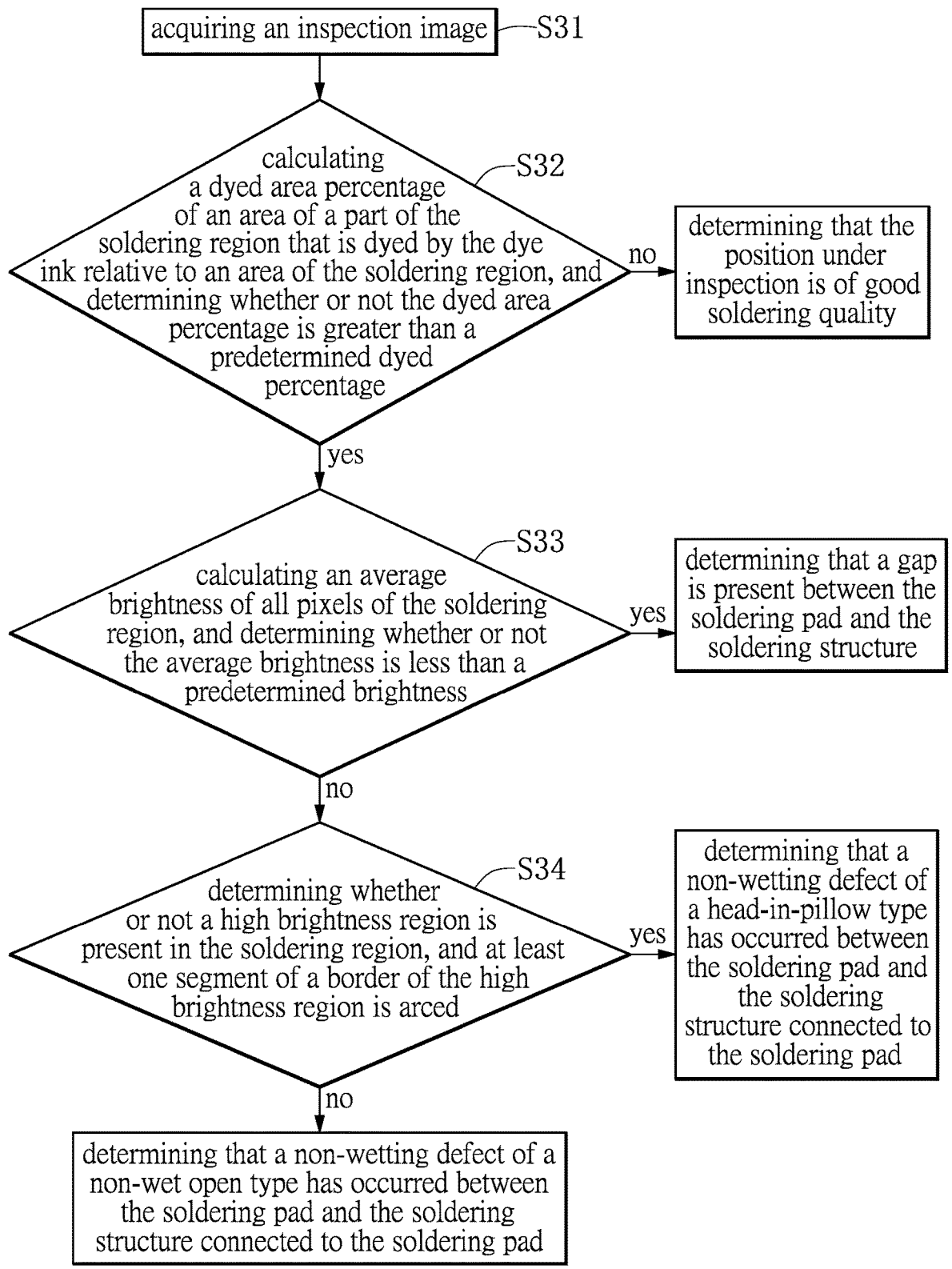
FIG. 9 is a flowchart of the soldering quality inspection method according to a fifth embodiment of the present disclosure.
Figure 10:
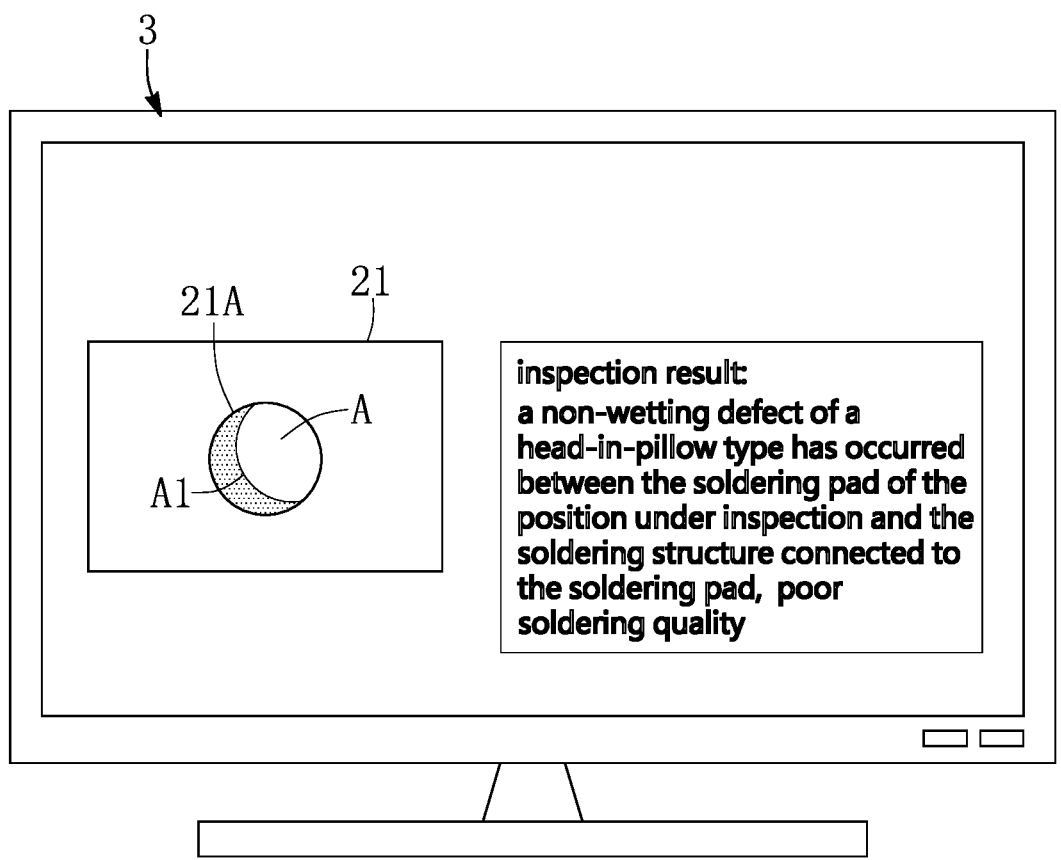
FIG. 10 and FIG. 11 respectively are schematic views showing inspection images that are determined to have non-wetting defects of a head-in-pillow type and a non-wet open type occurring between a soldering pad on a position under inspection and the soldering structure connected thereto as displayed on the display device according to the fifth embodiment of the present disclosure.
Figure 11:
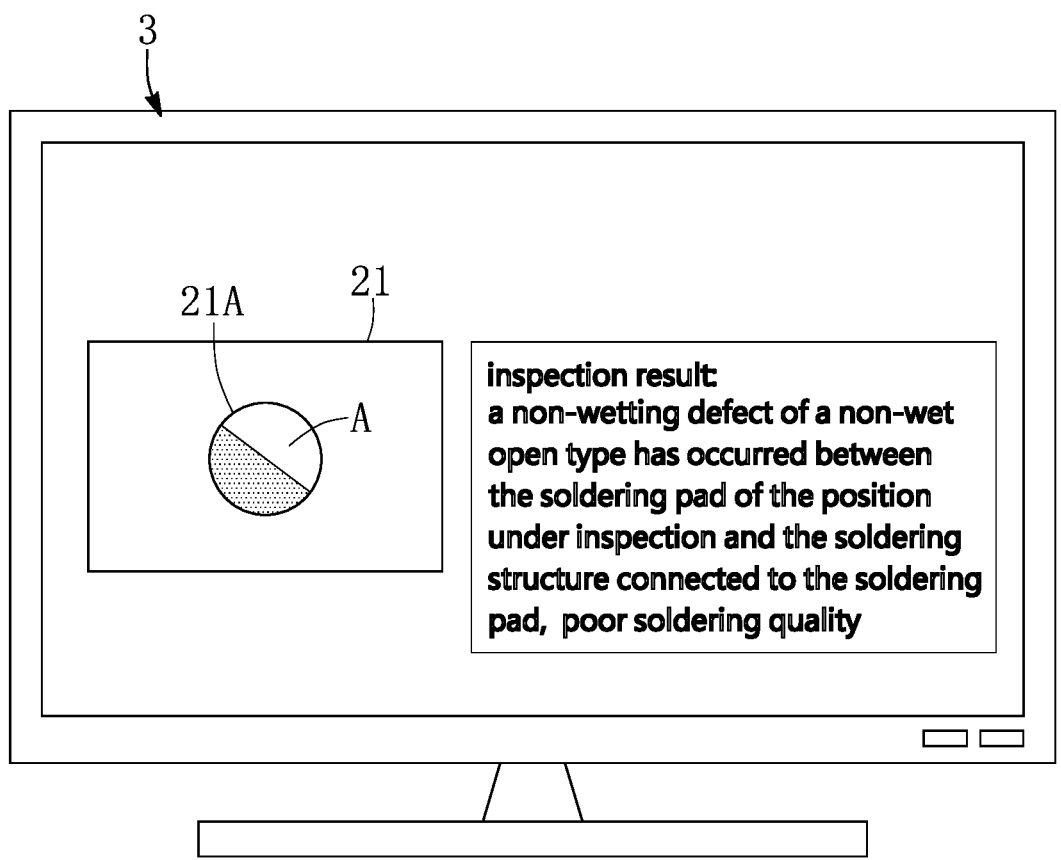

Reference is made to FIG. 1, which is to be read in conjunction with FIG. 9 to FIG. 11. The soldering quality inspection method of this embodiment sequentially includes an image acquisition step S31, a percentage calculating and quality determining step S32, a brightness determining step S33, and a border arc determining step S34. The image acquisition step S31 and the percentage calculating and quality determining step S32 are respectively the same as the image acquisition step S11 and the percentage calculating and quality determining step S12 of the first embodiment, and will not be repeated herein.

In the percentage calculating and quality determining step S32, if the processing device 1 determines that the dyed area percentage is greater than the predetermined dyed percentage (for example, when the dyed area percentage is equal to or greater than 1%), the following steps are performed.

The brightness determining step S33: using the processing device 1 to determine an average brightness of all the pixels of the soldering region 21A and determine whether or not the average brightness is less than a predetermined brightness.

When the processing device 1 determines that the average brightness is less than the predetermined brightness, the processing device 1 then determines that a gap is present at a position where the soldering pad and the substrate are connected and that the position under inspection is of poor soldering quality (the processing device 1 can further determine that the substrate of the assembly under inspection is of poor quality). The processing device 1 then generates the corresponding inspection result information. For example, the predetermined brightness is a brightness pre-stored in the processing device 1, and can be input by the relevant personnel.

Specifically, when a gap is present at the position where the soldering pad and the soldering structure are connected, after the electronic element is removed, a rough soldering pad and an intermetallic compound (IMC) will remain at the position under inspection. In the inspection image 21, the image of the soldering region 21A observed by the relevant personnel is represented as a rough surface with low brightness.

In continuation of the above, when the processing device 1 determines that a ratio of the regions that are dyed is greater than the predetermined dyed percentage in the soldering region 21A of the inspection image 21, the soldering structure is present in the soldering region 21A, and the average brightness of the soldering region 21A is lower than the predetermined brightness. Then, the relevant personnel can know from the corresponding inspection result information 11 generated by the processing device 1 that the assembly under inspection is of poor soldering quality, and one of the causes for the poor soldering quality can be that a gap is present at the position where the soldering pad and the soldering structure are connected. In this way, investigating whether or not the following issues are present in the manufacturing process of the electronic elements can be prioritized by the relevant personnel: a poor substrate quality or a poor substrate design (e.g., internal circuits of the substrate are too densely distributed in certain regions), inconsistency of sizes of solder balls or unevenness of surfaces of the solder balls, an insufficient amount of soldering paste, a poor surface-mount technology (SMT) process control (e.g., the heating temperature being uneven and rates of heating and cooling being too fast), etc.

In the brightness determining step S33, when the processing device 1 determines that the average brightness of the soldering region 21A is greater than the predetermined brightness, the border arc determining step S34 is performed. The border arc determining step S34 includes: using the processing device 1 to determine whether or not a high brightness region is present in the soldering region 21A, and at least one segment of a border of the high brightness region is arced. An average brightness of all pixels of the high brightness region is greater than an average brightness of remaining parts of the soldering region 21A.

As shown in FIG. 10, when the processing device 1 determines that a high brightness region A is present in the soldering region 21A and at least one segment A1 of the border of the high brightness region is arced, the processing device 1 then determines that a non-wetting defect of a head-in-pillow type has occurred between the soldering pad of the position under inspection and the soldering structure connected to the soldering pad and generates the corresponding inspection result information. In other words, the relevant personnel can know that the non-wetting defect of the head-in-pillow type may have occurred between the soldering pad of the position under inspection and the soldering structure connected to the soldering pad. In this way, investigating whether or not the following issues are present in the manufacturing process of the electronic elements can be prioritized by the relevant personnel: bending of the substrate, an insufficient amount of soldering structure, deformation of the substrate during a reflow process due to the high temperature, etc.

As shown in FIG. 11, when the processing device 1 determines that the high brightness region is present in the soldering region 21A and the border of the high brightness region does not have any arced segment, the processing device 1 then determines that a non-wetting defect of a non-wet open type has occurred between the soldering pad of the position under inspection and the soldering structure connected to the soldering pad and generates the corresponding inspection result information. In other words, the relevant personnel can know that the non-wetting defect of the non-wet open type has occurred between the soldering pad of the position under inspection and the soldering structure connected to the soldering pad. In this way, investigating whether or not the following issues are present in the manufacturing process of the electronic elements can be prioritized by the relevant personnel: deformation of the substrate, oxidation of the soldering pad, a poor SMT process control, an offset of solder mask printing, etc.

It should be noted that the processing device 1 can determine that the border of the high brightness region does not have any arced segment when the border of the high brightness region does not have any arced segment having a length greater than one third of a length of the border of the high brightness region, but is not limited thereto. That is, when the processing device 1 determines that the border of the high brightness region does not have any arced segment, it does not indicate that the border of the high brightness region completely has no arced segment.

In one of the specific applications, in the border arc determining step S34, the processing device 1 can determine that the high brightness area is present in the soldering region 21A when a percentage of a total number of pixels in the soldering region 21A having brightness higher than the average brightness of the soldering region 21A relative to the total number of pixels in the soldering region 21A is greater than 10%. Naturally, the processing device 1 can also use other approaches to determine whether or not the soldering region 21A includes the high brightness region.

Figure 12:
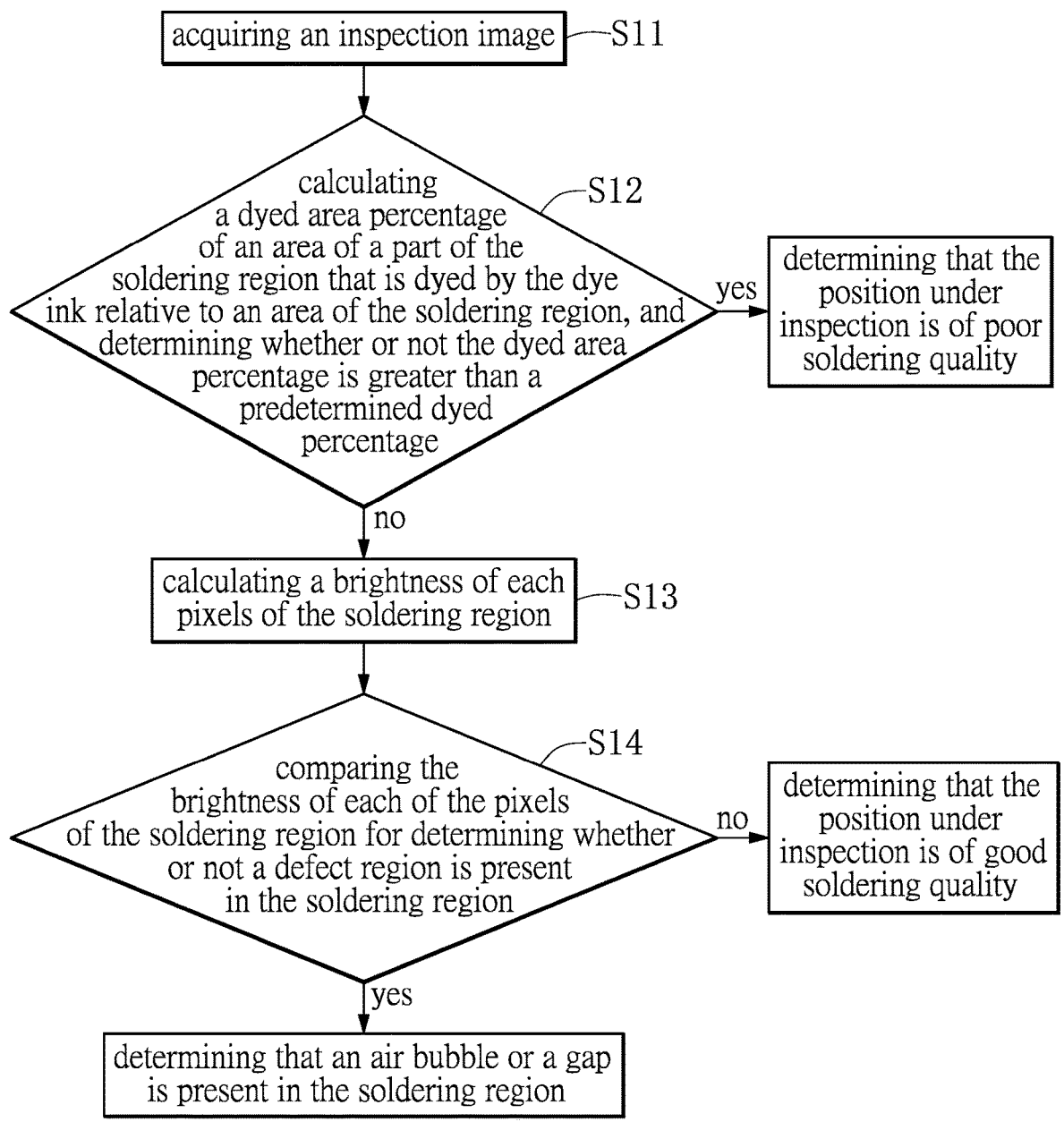
FIG. 12 and FIG. 13 respectively are a flowchart of the soldering quality inspection method according to a sixth embodiment of the present disclosure and a schematic view showing an inspection image that is determined to have an air bubble or a gap present in the soldering region as displayed on the display device according to the sixth embodiment of the present disclosure.
Figure 13:
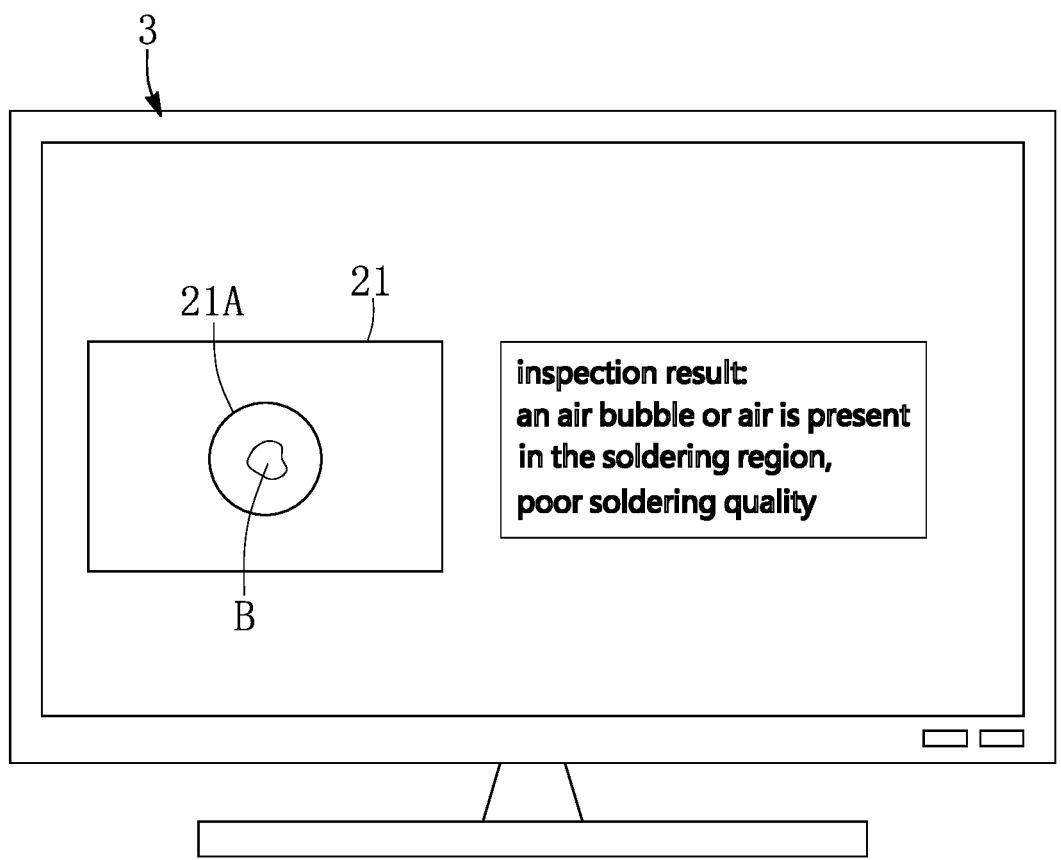

Reference is made to FIG. 1, which is to be read in conjunction with FIG. 12 and FIG. 13. The biggest difference between this embodiment and the aforementioned first embodiment lies in that, after the percentage calculating and quality determining step S12, if the processing device 1 determines that the dyed area percentage is not greater than (i.e., equal to or less than) the predetermined dyed percentage (e.g., from 0% to 5%), steps as follows are performed.

A brightness calculating step S13: the processing device 1 is used to calculate a brightness of each pixel of the soldering region 21A.

A defect determining step S14: the processing device 1 is used to compare the brightness of each of the pixels of the soldering region 21A for determining whether or not a defect region B is present in the soldering region 21A, and an average brightness of all pixels of the defect region B is lower than a predetermined brightness.

When the processing device 1 determines that at least one defect region B is present in the soldering region 21A (as shown in FIG. 13), the processing device 1 determines that an air bubble or a gap is present in the soldering region 21A and generates the corresponding inspection result information 11.

When the processing device determines that the soldering region 21A does not have any defect region B, the processing device determines that the position under inspection is of good soldering quality and generates the corresponding inspection result information 11.

In the defect determining step S14, the processing device 1 can determine a total area of the plurality of pixels after determining that the average brightness of these pixels is lower than the predetermined brightness. If the total area of these pixels is greater than a predetermined area, the processing device 1 can determine that the defect area B is present in the soldering region 21A. Alternatively, the processing device 1 can determine a ratio of the total area of the plurality of pixels to an area of the soldering region 21A after determining that the average brightness of these pixels is lower than the predetermined brightness. If the ratio of the total area of the plurality of pixels to the area of the soldering region 21A is greater than a predetermined ratio, the processing device 1 can determine that the defect area B is present in the soldering region 21A. For example, the processing device 1 can determine that the defect area B is present in the soldering region 21A when the area of the defect area B is determined to occupy more than 6.25% of the area of the soldering region 21A. In different embodiments, the processing device 1 can determine that the defect area B is present in the soldering region 21A only when a diameter of the defect area B is determined to be greater than 25% of that of the soldering region 21A.

Figure 14:
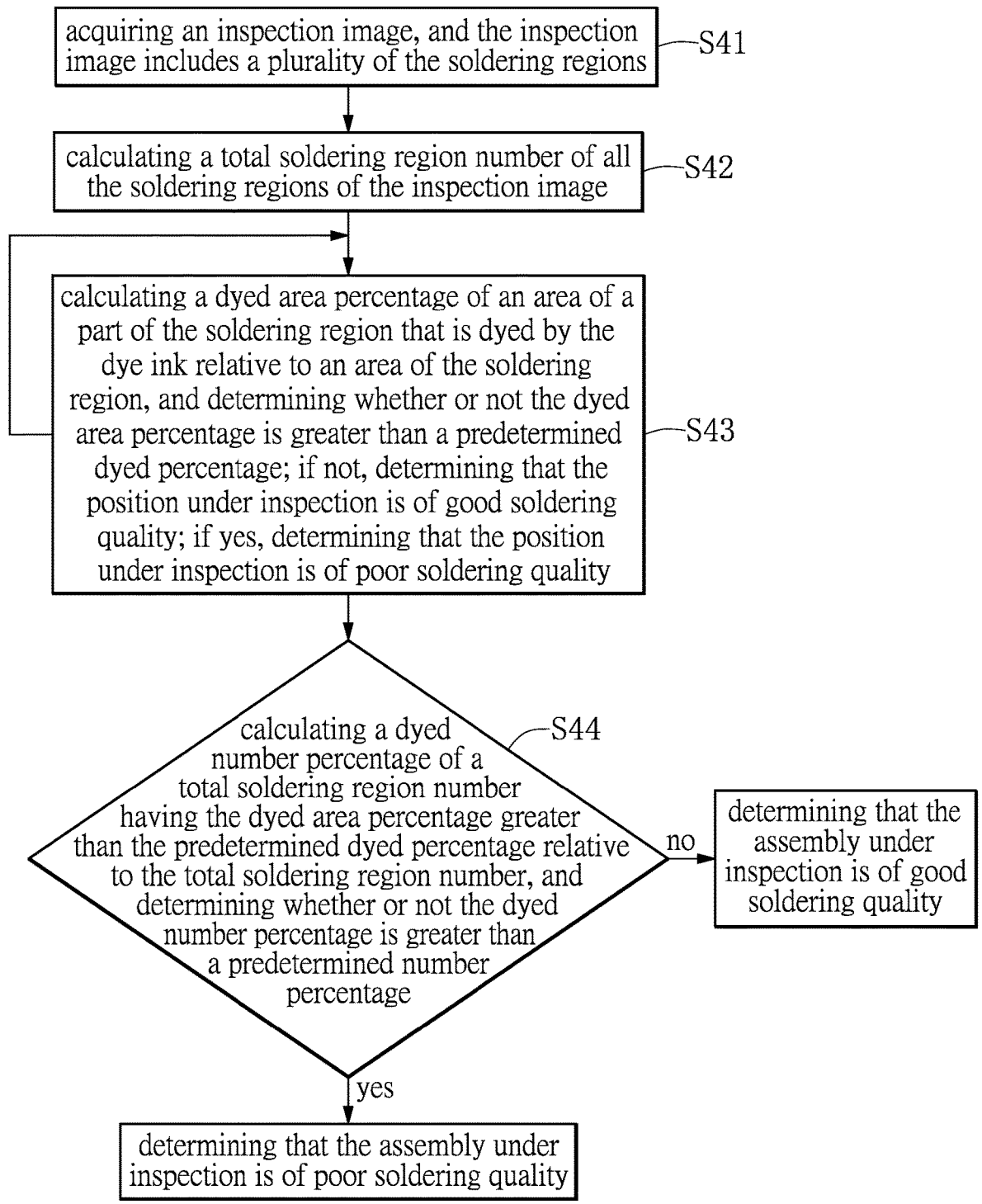
FIG. 14 is a flowchart of the soldering quality inspection method according to a seventh embodiment of the present disclosure.

Reference is made to FIG. 1, which is to be read in conjunction with FIG. 14. The soldering quality inspection method of the present disclosure can be used to inspect a soldering quality of an assembly under inspection. Specifically, the substrate has multiple soldering pads disposed thereon, and each of the soldering pads is connected to one of a plurality of the soldering structures. At least one of the electronic elements is connected to the plurality of soldering pads through the plurality of soldering structures, and positions for disposing each of the soldering pads on the substrate are each defined as one of the positions under inspection.

The soldering quality inspection method of this embodiment includes: an image acquisition step S41, an inspection number calculating step S42, a percentage calculating and quality determining step S43, and a total number percentage calculating and quality determining step S44. In the image acquisition step S41, the inspection image 21 includes multiple soldering regions, and each of the soldering regions is an image that corresponds to one of the positions under inspection. The percentage calculating and quality determining step S43 of this embodiment is the same as the percentage calculating and quality determining step S12 of the first embodiment, and will not be repeated herein.

The inspection number calculating step S42 includes: calculating a total soldering region number of all of the soldering regions of the inspection image 21. After the inspection number calculating step S42 is performed, the percentage calculating and quality determining step S43 is repeatedly performed for a predetermined number of times, and a number of the predetermined number of times is equal to the total soldering region number. Each time the percentage calculating and quality determining step S43 is performed, the processing device 1 calculates a dyed area percentage of a different one of the soldering regions, and generates the corresponding inspection result information 11 for each of the soldering regions.

In other words, assuming that the inspection image 21 has six soldering regions, the processing device 1 then repeatedly performs the percentage calculating and quality determining step S43 for six times. Each time the percentage calculating and quality determining step S43 is performed, the processing device 1 determines a soldering quality of a different one of the six soldering regions, and the corresponding inspection result information 11 is accordingly generated. It should be noted that, in an embodiment where the processing device 1 is a multi-core processor, the processing device 1 can simultaneously perform the percentage calculating and quality determining step S43 for different soldering regions in a multithreading manner After the percentage calculating and quality determining step S43 is performed for the predetermined number of times, the processing device 1 performs the total number percentage calculating and quality determining step S44. In the total number percentage calculating and quality determining step S44, the processing device 1 is used to calculate a dyed number percentage of a total soldering region number having the dyed area percentage greater than the predetermined dyed percentage relative to the total soldering region number, and determine whether or not the dyed number percentage is greater than a predetermined number percentage.

When the processing device 1 determines that the dyed number percentage is greater than the predetermined number percentage, the processing device 1 determines that the assembly under inspection is of poor soldering quality, and generates a corresponding assembly under inspection result information.

When the processing device 1 determines that the dyed number percentage is equal to or less than the predetermined number percentage, the processing device 1 determines that the assembly under inspection is of good soldering quality, and generates the corresponding assembly under inspection result information.

In one of the embodiments, the predetermined number percentage can be 0%. That is, as long as the processing device 1 determines that any of the positions under inspection is of poor soldering quality, the processing device 1 directly determines the assembly under inspection is of poor soldering quality.

In a different embodiment, assuming that the inspection image 21 has six soldering regions and the predetermined number percentage is 25%, when the processing device 1 repeatedly performs the percentage calculating and quality determining step S43 for six times and then determines that three soldering regions have positions under inspection that are of poor soldering quality, the processing device 1 determines that the assembly under inspection is of poor soldering quality. Conversely, if the processing device 1 repeatedly performs the percentage calculating and quality determining step S43 for six times, and then determines that only one soldering region has a position under inspection that is of poor soldering quality, the processing device 1 determines that the assembly under inspection is of good soldering quality.

In practical applications, in the inspection number calculating step S42, the processing device 1 can determine the total soldering region number of the inspection image through approaches such as image recognition (for example, being used in cooperation with a machine learning model) and comparison with the pre-stored images of the soldering region. However, there is no limitation as to how the processing device 1 calculates the total soldering region number of the inspection image.

For example, when a color of the solder mask of the substrate is dark green, colors of each of the soldering pads and the soldering structures are respectively and substantially gold and silver, and the soldering pads are substantially in a circular shape, the processing device 1 can first perform binarization processing on the inspection image 21, so that the colored inspection image is converted to only having the black and white colors. In the inspection image 21 that has undergone the binarization processing, regions corresponding to the solder mask are presented in the black color, and regions corresponding to the soldering pads or the soldering structures are presented in the white color. Then, the processing device 1 can determine whether or not each white colored region is substantially in a circular shape, and calculate a size (such as area and diameter) of each of the white colored regions, so as to determine whether or not each of the white colored regions corresponds to one of the soldering regions. Naturally, in an exemplary embodiment, the processing device 1 can also use a relevant machine learning model to directly perform determination and calculation of numbers for the soldering regions of the colored inspection image 21.

Figure 15:
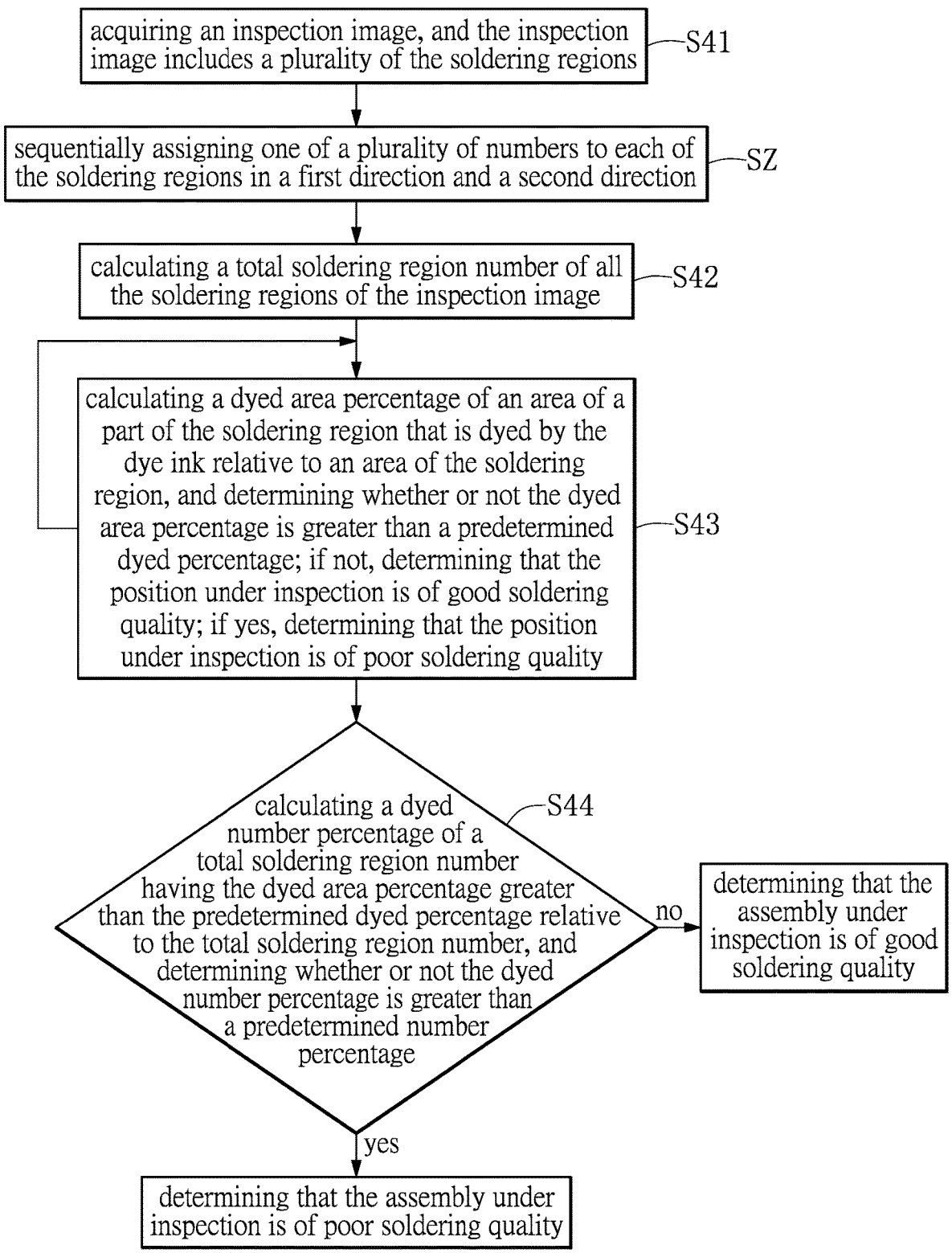
FIG. 15 is a flowchart of the soldering quality inspection method according to an eighth embodiment of the present disclosure.

Reference is made to FIG. 1, which is to be read in conjunction with FIG. 15. The biggest difference between this embodiment and the aforementioned seventh embodiment lies in that, the image acquisition step S41 and the percentage calculating and quality determining step S43 further have steps as follows in between.

A numbering step SZ: the processing device 1 is used to sequentially assign one of a plurality of numbers N to each of the plurality of soldering regions in a first direction and a second direction. The first direction is different from the second direction. The processing device 1 assigns a different one of the numbers N to each of the plurality of soldering regions.

After the numbering step SZ, according to the plurality of numbers N, the processing device 1 sequentially performs the percentage calculating and quality determining step S43 for the plurality of soldering regions. The processing device 1 then generates the corresponding inspection result information 11 for each of the soldering regions, and each of the inspection result information 11 includes a corresponding one of the plurality of numbers N. It should be noted that, in an embodiment where the processing device 1 is a multi-core processor, the processing device 1 can simultaneously perform the percentage calculating and quality determining step S43 for the soldering regions having different numbers in a multithreading manner.

In an exemplary embodiment, in the numbering step SZ, the processing device first rotates the inspection image by a predetermined angle, and then assigns the numbers to each of the soldering regions. In this way, through the numbers sequentially assigned by the processing device 1, the relevant personnel are allowed to know a location of the soldering region corresponding to a number in the currently viewed inspection result information 11 in a relatively intuitive manner.

Figure 16:
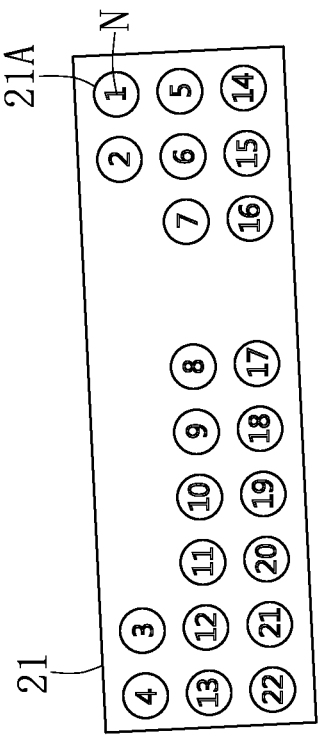
FIG. 16 is a schematic view of a numbering step of the soldering quality inspection method according to the eighth embodiment of the present disclosure.
Figure 16:
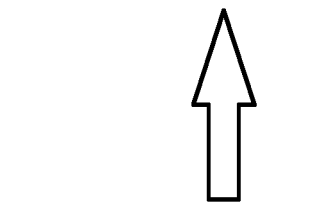
Figure 16:
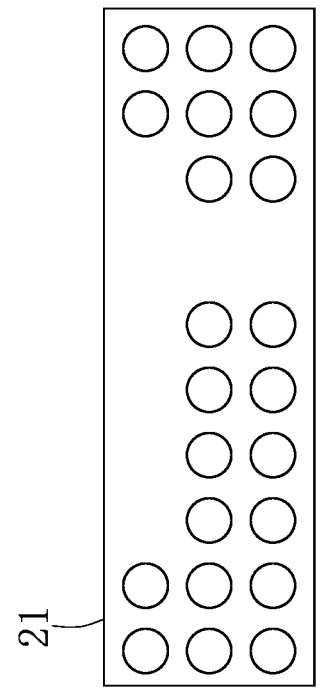

For example, as shown in FIG. 16, the processing device 1 can first rotate the inspection image 21 in a counterclockwise direction by 10° (i.e., the predetermined angle), and then sequentially assign numbers (i.e., the numbers 1 to 22 as shown in the figure) to each of the soldering regions from top to bottom and right to left (i.e., the first direction and the second direction, respectively) of the inspection image 21. Through a design of the numbering step SZ, the relevant personnel can intuitively and rapidly know the number of each of the soldering regions by viewing the inspection result information 11.

It should be noted that, the numbers N shown in FIG. 16 are only used to assist in explaining how the processing device 1 numbers the soldering regions 21A. In practical applications, during the process where the processing device 1 performs relevant image processing and determination on the inspection image 21, the processing device 1 is not configured to form the numbers (as shown in the figure) in each of the soldering regions 21A of the inspection image 21. Naturally, when the processing device 1 controls the display device 3 to display the inspection image 21, in order to allow the relevant personnel to know more clearly the soldering region 21A that corresponds to each of the inspection result information 11, the corresponding number N can be displayed close to each of the soldering regions 21A of the inspection image 21 as displayed on the display device 3.

How the processing device 1 sequentially numbers the soldering regions in the first direction and the second direction is not limited to the abovementioned process. Basically, the processing device 1 assigns the numbers to the soldering regions for allowing the relevant personnel to intuitively know which number corresponds to which one of the soldering regions.

It should be noted that the aforementioned embodiments can be combined with each other to form new embodiments according to actual requirements, and the content of each embodiment can be combined with that of another embodiment.

In summary, in the soldering quality inspection method and the soldering quality inspection apparatus provided by the present disclosure, the soldering quality of the position under inspection of the substrate or the soldering quality of the assembly under inspection can be rapidly and correctly determined, and there is no human determination involved in the determination process. Therefore, each determination is carried out according to the same standard, and the issue in the conventional technology where different personnel have completely different determination results upon observing the same substrate does not occur.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A soldering quality inspection method for inspecting a soldering quality of a position under inspection of an assembly under inspection, wherein the assembly under inspection is formed by an electronic assembly being immersed in a dye ink, drying the electronic assembly, and removing an electronic element of the electronic assembly; wherein the electronic assembly includes a substrate and the electronic element, the substrate has at least one soldering pad disposed thereon, the at least one soldering pad is connected with the electronic element through a soldering structure, and a position on the substrate for placement of the at least one soldering pad is defined as the position under inspection; wherein the soldering quality inspection method comprises:

an image acquisition step for acquiring an inspection image that includes at least one soldering region, wherein the at least one soldering region is an image that corresponds to the position under inspection; and a percentage calculating and quality determining step for calculating, by a processing device, a dyed area percentage of an area of a part of the at least one soldering region that is dyed by the dye ink relative to an area of the at least one soldering region, and determining, by the processing device, whether or not the dyed area percentage is greater than a predetermined dyed percentage;

wherein, when the processing device determines that the dyed area percentage is equal to or less than the predetermined dyed percentage, the processing device determines that the position under inspection is of good soldering quality and generates a corresponding inspection result information;

wherein, when the processing device determines that the dyed area percentage is greater than the predetermined dyed percentage, the processing device determines that the position under inspection is of poor soldering quality and generates the corresponding inspection result information;

wherein the image acquisition step and the percentage calculating and quality determining step further have a soldering structure determining step in between, and the soldering structure determining step includes: determining, by the processing device, whether or not a soldering structure image is present in the at least one soldering region; wherein the soldering structure image is an image that corresponds to the soldering structure on the substrate;

wherein, when the processing device determines that the soldering structure image is not present in the at least one soldering region, the processing device then determines that a gap is present between the at least one soldering pad and the substrate and that the position under inspection is of poor soldering quality, and generates the corresponding inspection result information, so that the processing device does not perform the percentage calculating and quality determining step;

wherein, when the processing device determines that the soldering structure image is present in the at least one soldering region, the processing device then performs the percentage calculating and quality determining step.

2. The soldering quality inspection method according to claim 1, wherein the image acquisition step and the percentage calculating and quality determining step further have an image processing step in between; wherein in the image processing step, according to at least one of a color of the dye ink, a color of the soldering structure and a color of a solder mask of the substrate, the processing device is used to adjust at least one of an red value, a green value, and a blue value of pixels of at least one portion of the inspection image, or to adjust at least one of an hue value, an saturation value, and a brightness value of the pixels of the at least one portion of the inspection image.

3. The soldering quality inspection method according to claim 1, wherein in the image acquisition step, an auxiliary light source is controlled to project an auxiliary light beam to the position under inspection of the substrate, an image capturing device is controlled to capture an image of the position under inspection of the substrate so as to generate the inspection image, and the image capturing device is then controlled to transmit the inspection image to the processing device; wherein a color of the auxiliary light beam and a color of the dye ink are analogous colors, or the color of the auxiliary light beam is decided based on a color of the dye ink and a subtractive color mixing process, such that pixels in the inspection image that correspond to positions of the substrate that are dyed by the dye ink have a grey color or a black color.

4. The soldering quality inspection method according to claim 1, wherein in the percentage calculating and quality determining step, when the processing device determines that the dyed area percentage is greater than the predetermined dyed percentage, a brightness determining step is performed; wherein the brightness determining step includes calculating, by the processing device, an average brightness of all pixels of the at least one soldering region, and determining whether or not the average brightness is less than a predetermined brightness; wherein, when the processing device determines that the average brightness is less than the predetermined brightness, the processing device then determines that a gap is present between the at least one soldering pad and the substrate and that the position under inspection is of poor soldering quality, and generates the corresponding inspection result information; wherein the predetermined dyed percentage is equal to or greater than 1%.

5. The soldering quality inspection method according to claim 4, wherein in the brightness determining step, when the processing device determines that the average brightness is equal to or greater than the predetermined brightness, a border arc determining step is performed; wherein the border arc determining step includes:

determining, by the processing device, whether or not a high brightness region is present in the at least one soldering region, and whether or not at least one segment of a border of the high brightness region is arced; wherein an average brightness of all pixels of the high brightness region is greater than an average brightness of remaining parts of the at least one soldering region;

wherein, when the processing device determines that the high brightness region is present in the at least one soldering region and the at least one segment of the border of the high brightness region is arced, the processing device then determines that a non-wetting defect of a head-in-pillow type has occurred between the at least one soldering pad and the soldering structure connected thereto and that the position under inspection is of poor soldering quality, and generates the corresponding inspection result information;

wherein, when the processing device determines that the high brightness region is present in the at least one soldering region but the border of the high brightness region does not have any arced segment, the processing device then determines that the non-wetting defect of a non-wet open type has occurred between the at least one soldering pad and the soldering structure connected thereto and that the position under inspection is of poor soldering quality, and generates the corresponding inspection result information.

6. The soldering quality inspection method according to claim 5, wherein in the border arc determining step, when the processing device determines that a percentage of a total number of pixels in the at least one soldering region that have a brightness greater than the average brightness relative to the total number of all the pixels of the at least one soldering region is greater than 10%, the processing device determines that the at least one soldering region includes the high brightness region.

7. The soldering quality inspection method according to claim 1, wherein in the percentage calculating and quality determining step, when the processing device determines that the dyed area percentage is equal to or less than the predetermined dyed percentage, following steps are performed:

a brightness calculating step for calculating, by the processing device, a brightness of each of pixels of the at least one soldering region; and a defect determining step for comparing, by the processing device, the brightness of each of the pixels of the at least one soldering region, so as to determine whether or not a defect region is present in the at least one soldering region, wherein an average brightness of all pixels of the defect region is lower than a predetermined brightness;

wherein, when the processing device determines that a quantity of the defect region present in the at least one soldering region is at least one, the processing device determines that an air bubble or a gap is present in the at least one soldering region and that the position under inspection is of poor soldering quality, and generates the corresponding inspection result information;

wherein, when the processing device determines that the at least one soldering region does not have any defect region, the processing device determines that the position under inspection is of good soldering quality and generates the corresponding inspection result information; wherein the predetermined dyed percentage is between 0% and 25%.

8. The soldering quality inspection method according to claim 1, wherein the at least one soldering pad disposed on the substrate is plural in number, and each of the soldering pads is connected to one of the soldering structures; wherein at least one of the electronic elements is connected to the soldering pads through the soldering structures, and the positions on the substrate for placement of the soldering pads are defined as the positions under inspection; wherein the soldering quality inspection method is used to inspect the soldering quality of the assembly under inspection; wherein in the image acquisition step, the at least one soldering region included in the inspection image is plural in number, and each of the soldering regions is the image that corresponds to one of the positions under inspection; wherein the image acquisition step and the percentage calculating and quality determining step further have following steps in between:
  an inspection number calculating step for calculating a total soldering region number of all the soldering regions of the inspection image;
  after performing the inspection number calculating step, repeatedly performing the percentage calculating and quality determining step for a predetermined number of times, wherein the predetermined number of times is equal to the total soldering region number, and each time the percentage calculating and quality determining step is performed, the processing device calculates the dyed area percentage of a different one of the soldering regions;
  after performing the percentage calculating and quality determining step for the predetermined number of times, following steps are performed:
    a total number percentage calculating and quality determining step for calculating, by the processing device, a dyed number percentage of a total soldering region number having the dyed area percentage greater than the predetermined dyed percentage relative to the total soldering region number, and determining whether or not the dyed number percentage is greater than a predetermined number percentage;
    wherein, when the processing device determines that the dyed number percentage is greater than the predetermined number percentage, the processing device determines that the assembly under inspection is of poor soldering quality, and generates a corresponding assembly under inspection result information;
    wherein, when the processing device determines that the dyed number percentage is equal to or less than the predetermined number percentage, the processing device determines that the assembly under inspection is of good soldering quality, and generates the corresponding assembly under inspection result information.

9. The soldering quality inspection method according to claim 8, wherein the image acquisition step and the percentage calculating and quality determining step further have following steps in between:
  a numbering step for sequentially assigning, by the processing device, one of a plurality of numbers to each of the soldering regions in a first direction and a second direction, wherein the first direction is different from the second direction; wherein the processing device assigns a different one of the numbers to each of the soldering regions;
  wherein, after the numbering step, the processing device sequentially performs the percentage calculating and quality determining step on the soldering regions according to the numbers, and then generates the corresponding inspection result information for each of the soldering regions, and each of the inspection result information includes a corresponding one of the numbers.

10. The soldering quality inspection method according to claim 9, wherein in the numbering step, the processing device first rotates the inspection image by a predetermined angle, and then sequentially and respectively assigns the numbers to the soldering regions in the first direction and the second direction.

11. A soldering quality inspection apparatus, comprising: a carrier, a processing device, an image capturing device and an outputting device, wherein the carrier is used to carry a substrate, and the image capturing device and the outputting device are each electrically connected with the processing device; wherein the processing device is used to perform a soldering quality inspection method for inspecting a soldering quality of a position under inspection of an assembly under inspection, wherein the assembly under inspection is formed by an electronic assembly being immersed in a dye ink, drying the electronic assembly, and removing an electronic element of the electronic assembly; wherein the electronic assembly includes the substrate and the electronic element, the substrate has at least one soldering pad disposed thereon, the at least one soldering pad is connected with the electronic element through a soldering structure, and a position on the substrate for placement of the at least one soldering pad is defined as the position under inspection; wherein the soldering quality inspection method includes:
  an image acquisition step for controlling the image capturing device to perform image capturing on the position under inspection of the assembly under inspection that is disposed on the carrier, so as to acquire an inspection image that includes at least one soldering region, wherein the at least one soldering region is an image that corresponds to the position under inspection; and
  a percentage calculating and quality determining step for calculating a dyed area percentage of an area of a part of the at least one soldering region that is dyed by the dye ink relative to an area of the at least one soldering region, and determining whether or not the dyed area percentage is greater than a predetermined dyed percentage;
    wherein, when the dyed area percentage is determined to be equal to or less than the predetermined dyed percentage, the position under inspection is determined to be of good soldering quality, and a corresponding inspection result information is generated and transmitted to the outputting device;
    wherein, when the dyed area percentage is determined to be greater than the predetermined dyed percentage, the position under inspection is determined to be of poor soldering quality, and the corresponding inspection result information is generated and transmitted to the outputting device;
    wherein the image acquisition step and the percentage calculating and quality determining step further have a soldering structure determining step in between, and the soldering structure determining step includes: determining whether or not a soldering structure image is present in the at least one soldering region; wherein the soldering structure image is an image that corresponds to the soldering structure on the substrate;

wherein, when the soldering structure image is determined to be not present in the at least one soldering region, a gap is determined to be present between the at least one soldering pad and the substrate, and the position under inspection is of poor soldering quality, such that the corresponding inspection result information is generated, and the percentage calculating and quality determining step is not performed;

wherein, when the soldering structure image is determined to be present in the at least one soldering region, the percentage calculating and quality determining step is performed.

12. The soldering quality inspection apparatus according to claim 11, wherein in the percentage calculating and quality determining step, when the dyed area percentage is determined to be greater than the predetermined dyed percentage, a brightness determining step is performed; wherein the brightness determining step includes calculating an average brightness of all pixels of the at least one soldering region, and determining whether or not the average brightness is less than a predetermined brightness; wherein, when the average brightness is determined to be less than the predetermined brightness, a gap is determined to be present between the at least one soldering pad and the substrate, and the position under inspection is of poor soldering quality, such that the corresponding inspection result information is generated; wherein the predetermined dyed percentage is equal to or greater than 1%.

13. The soldering quality inspection apparatus according to claim 12, wherein in the brightness determining step, when the average brightness is determined to be equal to or greater than the predetermined brightness, a border arc determining step is performed; wherein the border arc determining step includes:

determining whether or not a high brightness region is present in the at least one soldering region, and at least one segment of a border of the high brightness region is arced; wherein an average brightness of all pixels of the high brightness region is greater than an average brightness of remaining parts of the at least one soldering region;

wherein, when the high brightness region is determined to be present in the at least one soldering region and the at least one segment of the border of the high brightness region is arced, a non-wetting defect of a head-in-pillow type is determined to have occurred between the at least one soldering pad and the soldering structure connected thereto, and the position under inspection is of poor soldering quality, such that the corresponding inspection result information is generated;

wherein, when the high brightness region is determined to be present in the at least one soldering region and the border of the high brightness region does not have any arced segment, the non-wetting defect of a non-wet open type is determined to have occurred between the at least one soldering pad and the soldering structure connected thereto, and the position under inspection is of poor soldering quality, such that the corresponding inspection result information is generated.

14. The soldering quality inspection apparatus according to claim 13, wherein in the border arc determining step, when a percentage of a total number of pixels in the at least one soldering region that have a brightness greater than the average brightness relative to the total number of all the pixels of the at least one soldering region is determined to be greater than 10% in the at least one soldering region, the at least one soldering region is determined to include the high brightness region.

15. The soldering quality inspection apparatus according to claim 11, wherein in the percentage calculating and quality determining step, when the dyed area percentage is determined to be equal to or less than the predetermined dyed percentage, following steps are performed:

a brightness calculating step for calculating a brightness of each of pixels of the at least one soldering region; and a defect determining step for comparing the brightness of each of the pixels of the at least one soldering region for determining whether or not a defect region is present in the at least one soldering region, wherein an average brightness of all pixels of the defect region is lower than a predetermined brightness;

wherein, when a quantity of the defect region present in the at least one soldering region is determined to be at least one, an air bubble or a gap is determined to be present in the at least one soldering region, and the position under inspection is of poor soldering quality, such that the corresponding inspection result information is generated;

wherein, when the at least one soldering region is determined to not have any defect region, the position under inspection is determined to be of good soldering quality, such that the corresponding inspection result information is generated; wherein the predetermined dyed percentage is between 0% and 25%.

16. The soldering quality inspection apparatus according to claim 11, wherein the at least one soldering pad disposed on the substrate is plural in number, and each of the soldering pads is connected to one of the soldering structures; wherein at least one of the electronic elements is connected to the soldering pads through the soldering structures, and the positions on the substrate for placement of the soldering pads are defined as the positions under inspection; wherein the soldering quality inspection method is used to inspect the soldering quality of the assembly under inspection; wherein in the image acquisition step, the at least one soldering region included in the inspection image is plural in number, and each of the soldering regions is the image that corresponds to one of the positions under inspection; wherein the image acquisition step and the percentage calculating and quality determining step further have steps as follows in between:

an inspection number calculating step for calculating a total soldering region number of all of the soldering regions of the inspection image;

after performing the inspection number calculating step, repeatedly performing the percentage calculating and quality determining step for a predetermined number of times, wherein the predetermined number of times is equal to the total soldering region number, and each time the percentage calculating and quality determining step is performed, the dyed area percentage of a different one of the soldering regions is calculated;

after performing the percentage calculating and quality determining step for the predetermined number of times, performing steps as follows:

a total number percentage calculating and quality determining step for calculating a dyed number percentage of a total soldering region number having the dyed area percentage greater than the predetermined dyed percentage relative to the total soldering region number, and determining whether or not the dyed number percentage is greater than a predetermined number percentage;

wherein, when the dyed number percentage is determined to be greater than the predetermined number percentage, the assembly under inspection is determined to be of poor soldering quality, and a corresponding assembly under inspection result information is generated;

wherein, when the dyed number percentage is determined to be equal to or less than the predetermined number percentage, the assembly under inspection is determined to be of good soldering quality, and the corresponding assembly under inspection result information is generated.

17. The soldering quality inspection apparatus according to claim 16, wherein the image acquisition step and the percentage calculating and quality determining step further have following steps in between:

a numbering step for rotating the inspection image by a predetermined angle, or adjusting a position of at least one of the soldering regions in the inspection image, so as to sequentially assign one of a plurality of numbers to each of the soldering regions in a first direction and a second direction, wherein the first direction is different from the second direction; wherein the processing device assigns a different one of the numbers to each of the soldering regions;

wherein, after the numbering step, the percentage calculating and quality determining step is sequentially performed on the soldering regions according to the numbers, the corresponding inspection result information for each of the soldering regions is generated, and each of the inspection result information includes a corresponding one of the numbers.

18. The soldering quality inspection apparatus according to claim 17, wherein in the numbering step, the processing device first rotates the inspection image by the predetermined angle, and then sequentially and respectively assigns the numbers to the soldering regions in the first direction and the second direction.

* * * * *